United States Patent
Anderson et al.

(10) Patent No.: US 9,360,933 B2
(45) Date of Patent: *Jun. 7, 2016

(54) VIRTUAL LINKS BETWEEN DIFFERENT DISPLAYS TO PRESENT A SINGLE VIRTUAL OBJECT

(71) Applicant: Intel Corporation, Santa Clara, CA (US)

(72) Inventors: Glen J. Anderson, Beaverton, OR (US); Ryan Palmer, Portland, OR (US); Jose K. Sia, Jr., Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/247,663

(22) Filed: Apr. 8, 2014

(65) Prior Publication Data

US 2014/0300565 A1    Oct. 9, 2014

Related U.S. Application Data

(63) Continuation of application No. 13/335,866, filed on Dec. 22, 2011, now Pat. No. 8,736,583, which is a continuation-in-part of application No. 13/074,639, filed on Mar. 29, 2011, now Pat. No. 8,717,318.

(51) Int. Cl.
    *G06F 3/01* (2006.01)
    *A63F 13/20* (2014.01)
    (Continued)

(52) U.S. Cl.
    CPC ............... *G06F 3/011* (2013.01); *A63F 13/06* (2013.01); *G06F 3/013* (2013.01); *G06F 3/017* (2013.01);
    (Continued)

(58) Field of Classification Search
    CPC .... G06F 3/0482; G06F 3/0484; G06F 3/0485; G06F 3/0486; G06F 3/0488; G06F 3/04883; G06F 3/011; G06F 3/013; G06F 3/017; G06F 3/0304; A63F 13/06; A63F 2300/1068; A63F 2300/1081; A63F 2300/1093; A63F 2300/6045
    USPC ............ 345/156, 173, 175; 178/18.03–18.07, 178/18.09; 715/863, 864
    See application file for complete search history.

(56) References Cited

U.S. PATENT DOCUMENTS 7,578,742 B2 * 8/2009 Miyamoto .............. A63F 13/02
                                                    345/173
7,855,713 B2 * 12/2010 Egashira ................. A63F 13/00
                                                    345/156

(Continued)

FOREIGN PATENT DOCUMENTS

| CN | 1914982 A | 4/2007 |
| CN | 101952818 A | 1/2011 |
| TW | 201019241 A | 5/2010 |

OTHER PUBLICATIONS

Office Action and Search Report dated Jan. 14, 2016 issued by the Taiwan IPO in corresponding TW Application No. 100149538, along with English translation of Search Report, 12 pages total.

*Primary Examiner* — Tom Sheng

(74) *Attorney, Agent, or Firm* — Buckley, Maschoff & Talwalkar LLC

(57) ABSTRACT

Virtual links are used between two different displays to represent a single virtual object. In one example, the invention includes generating a three-dimensional space having a first display of a real first device and a second display of a real second device and a space between the first display and the second display, receiving a launch command as a gesture with respect to the first display, the launch command indicating that a virtual object is to be launched through the space toward the second display, determining a trajectory through the space toward the second display based on the received launch command, and presenting a portion of the trajectory on the second display.

24 Claims, 20 Drawing Sheets

(51) Int. Cl.
*G06F 3/03* (2006.01)
*G06F 3/0484* (2013.01)
*G06F 3/0488* (2013.01)

(52) U.S. Cl.
CPC ............ *G06F 3/0304* (2013.01); *G06F 3/0484* (2013.01); *G06F 3/04883* (2013.01); *A63F 2300/1068* (2013.01); *A63F 2300/1081* (2013.01); *A63F 2300/1093* (2013.01); *A63F 2300/6045* (2013.01)

(56) References Cited

U.S. PATENT DOCUMENTS

| | | | | |
|---|---|---|---|---|
| 8,046,701 B2* | 10/2011 | Chiu | ................... | G06F 3/04883 715/730 |
| 8,077,157 B2* | 12/2011 | Sengupta | ............ | G06F 3/04883 345/1.2 |
| 8,194,043 B2* | 6/2012 | Cheon | ................... | G06F 1/1616 345/1.1 |
| 8,350,814 B2* | 1/2013 | Kim | ....................... | G06F 1/1616 345/168 |
| 8,512,115 B2* | 8/2013 | Namba | ................... | A63F 13/06 463/31 |
| 8,717,318 B2* | 5/2014 | Anderson | ............... | G06F 3/011 345/173 |
| 8,736,583 B2* | 5/2014 | Anderson | ............... | A63F 13/06 345/175 |
| 2005/0221893 A1* | 10/2005 | Ohta | ....................... | A63F 13/10 463/36 |
| 2007/0265081 A1* | 11/2007 | Shimura | ................. | A63F 13/10 463/37 |
| 2009/0244015 A1 | 10/2009 | Sengupta et al. | | |
| 2010/0105443 A1* | 4/2010 | Vaisanen | ............... | G06F 3/0486 455/566 |
| 2010/0188352 A1* | 7/2010 | Ikeda | ................... | G06F 3/0486 345/173 |
| 2011/0007021 A1* | 1/2011 | Bernstein | .............. | G06F 3/0416 345/174 |
| 2011/0234543 A1* | 9/2011 | Gardenfors | ............ | G06F 3/005 345/175 |
| 2011/0296329 A1* | 12/2011 | Tanaka | ................... | G06F 1/1647 715/769 |

* cited by examiner

VIRTUAL LINKS BETWEEN DIFFERENT DISPLAYS TO PRESENT A SINGLE VIRTUAL OBJECT

CROSS-REFERENCE TO RELATED APPLICATIONS

This application is a continuation of U.S. patent application Ser. No. 13/335,866, filed Dec. 22, 2011 entitled "Virtual Links Between Different Displays to Present a Single Virtual Object," which was a continuation-in-part of prior U.S. patent application Ser. No. 13/074,639, filed Mar. 29, 2011, entitled "Continued Virtual Links Between Gestures and User Interface Elements," the priority of both of which are hereby claimed. The entire contents of both of these applications are incorporated herein by reference.

BACKGROUND

Typical computing input air-gestures (air-gestures as opposed to touch screen gestures) can involve users moving their body and having a corresponding action happen on a display. Current air gesture technology uses either sensors (such as in the Wii remote controller by the Nintendo Company) or 3D camera technology (such as in the Microsoft Kinect by the Microsoft Corporation) to approximate body motion as a modal input source. Television displays are typical feedback mechanisms for viewing the effects of air-gesture modal input on a graphical environment. Integrated cameras are known that gather video input for gesture detection, and rudimentary interpretation of gesture input may accomplished with software that can run on a PC. QualiEYE by the EVAS Corporation is an example of this type of software product. The addition of depth sensing camera technology has also been known to provide the ability to recognize where a person's body is in relation to a display or compute device. In addition, mobile displays that incorporate touch-screen technology, such as laptops, tablets and smartphones the screens of which respond to touch input are also well known. Touch and sweep gestures on a display screen to move objects from one screen (e.g. a handheld console screen) to another screen (e.g. a TV screen) in the context of electronic games have also been made possible, and may be implemented for example when using the PlayStation Portable game console marketed by the Sony Corporation. In addition, the Kitty Cat Coin Toss marketed through iTunes by the Apple Corporation is an application that can detect a flip motion of an iPhone and flips a virtual coin on the iPhone's screen. Above-screen interactions with objects on a screen using gesture have also been researched.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1A:
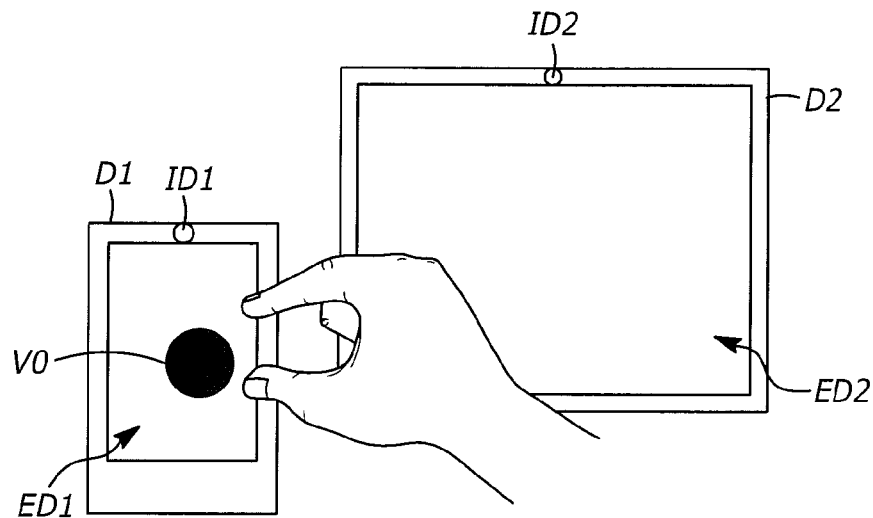
FIGS. 1a-1h illustrates a process to move a virtual object across screens according to a first embodiment.

For games and other usages that involve virtually picking up objects from the X-Y plane of the screen and gesturing to drop or throw objects back at the screen, visual feedback makes the user interaction more engaging. An augmented reality reflection of what the user is virtually holding, after virtually picking it up off a touch screen makes the game more fun. Further interactions with user gestures provide an even more engaging experience.

As camera technology with the ability to detect human motion in three dimensions continues to shrink in size and price, eventually laptops and smartphones can become a platform for camera technology involving the use of cameras to detect user gestures as modal inputs to devices using mobile platforms. Since, as noted previously, mobile displays that respond to touch are becoming ubiquitous on mobile devices, an embodiment proposes pairing air-gesture input closely with touch-gesture for electronic devices in order to allow a more versatile manipulation of objects. According to one embodiment, the air movements of a user's body part are tracked using an image detector, and input data from such tracking is mapped to control input to move a virtual object beyond an electronic display. By "display," what is meant is a visual display, whether on a screen of a device, or whether projected from a device to form a visual image exterior to the device, such as, for example, a projected display on wall.

The instant description provides several novel interaction approaches and gestures that may for example be accomplished with touch screens and 3D cameras. It also proposes cross-device gestures to move objects in novel ways across displays, for example across displays on separate devices.

According to embodiments, a device includes a processor to receive input data from an image detector, where the input data includes data obtained from tracking air movements of a user's body part interacting with a virtual object of the electronic display, the processor to map the input data to a control input to move the virtual object beyond the display. The device could, for example, include a mobile device such as a smartphone or a laptop. The processor according to embodiments is to map the input data to a control input to move the virtual object beyond the electronic display. Thus, the processor could map the input data to the control input to, for example, either move the virtual object from the display to another display, or move the virtual object to a virtual space (e.g. a bezel) of the device. According to one embodiment, input data is fed to the processor from both an image detector and a touch screen sensor coupled to a screen of the display in order to allow a mapping of the input data to control data to move the virtual object beyond the display. For example, the touch screen sensor may allow the virtual object to be pinched from the display, before being removed or lifted beyond the display. A pinch gesture may thus allow one to control an object, while a removal gesture may allow one to virtually remove that object from a display. Optionally, the processor may map the input data to control input to create a virtual binding of the virtual object in order to create a visual rendering of a connection between the virtual object and the user's body part. The virtual binding may comprise a visual rendering, such as in 3D, of a connection between a user's body part and the VO that is being controlled by the user's body part. A virtual binding may for example be depicted as a 3D virtual tether between the fingers and the VO being manipulated. The virtual binding could thus for example be a dynamic screen image that graphically depicts how a VO that is virtually controlled by a user's body part behaves in response to the user moving that body part. The appearance of the binding may be determined by an angle and position of the body part holding the VO. # According to another embodiment, the processor is to map the input data to control input to place the virtual object onto a second display of a second electronic device. The air movements may include a releasing motion of the user's body part with respect to a target location of the virtual object on this second display. The processor may further map the input data to control input to determine an inertial behavior of the virtual object once on the second display. In the instant description, reference to a "user's body part" is meant to refer to any body part, such as a hand, finger, palm knuckles, feet, legs, eyes, head, etc. In addition, reference to a "user's hand" is meant to encompass all of a user's hand, and/or including any part of the hand, such as fingers, palm, knuckles, etc.

Embodiments will be described with respect to the examples of FIGS. 1a-1h, FIGS. 2a-2d and FIGS. 3a-3c, each of those in conjunction with FIG. 4.

Referring to of FIGS. 1a-1h, FIGS. 2a-2d and FIGS. 3a-3c common elements as between those figures will now be described. In each of those figures, the virtual object VO is depicted as a ball for ease of depiction, although it is understood that the VO may have any suitable shape. The VO may for example include an icon, a picture or an animated graphical illustration. The VO may for example include a graphical representation of an object sensed by standard camera input, or characteristics, such as color, that the user may select. The VO may further include a game piece with attributes that cause it to act in a certain way, such as a bomb versus an arrow in a game setting. In addition, the VO may include a single VO, or a plurality of VO's. Also shown in the noted figures are two devices D1 and D2 (although D2 is not necessarily needed in the embodiment of FIGS. 3a-3c). In the shown embodiments, D1 is depicted as a smartphone device including a display ED1, and D2 is depicted as a personal computer including a display ED2. As seen in FIGS. 1a-1h, FIGS. 2a-2d and FIGS. 3a-3c, each of D1 and D2 are equipped with an image detector ID1 and ID2, respectively. The various components shown in FIGS. 1a-1h, FIGS. 2a-2d and FIGS. 3a-3c are explained in further detail with respect to FIG. 4 below.

Figure 3A:
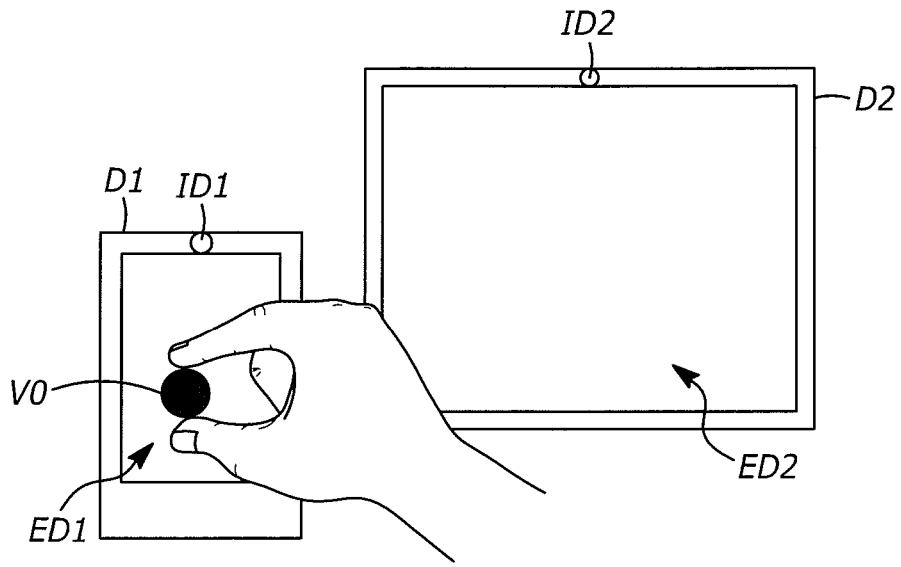
FIGS. 3a-3c illustrates a process to move a virtual object to a bezel area of a display screen.
Figure 3B:
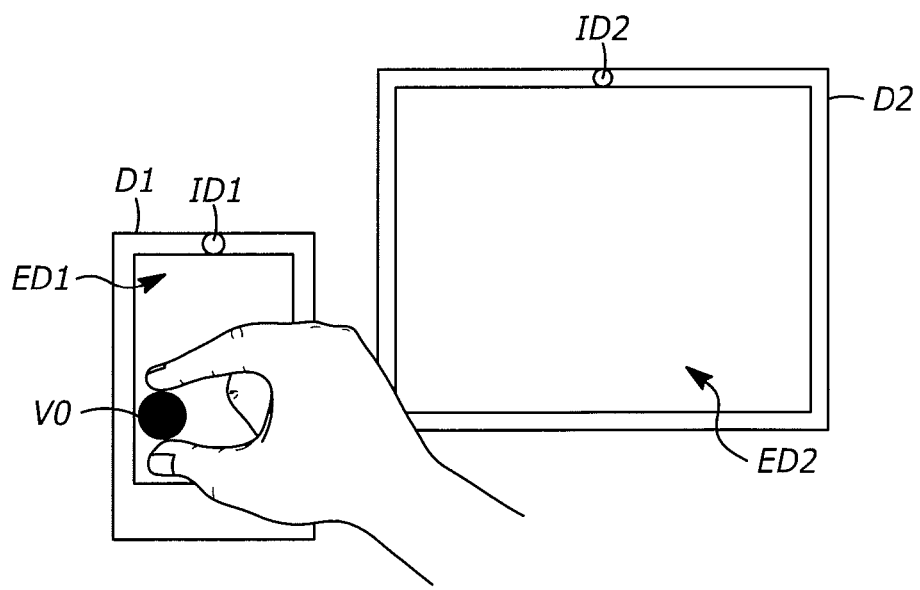
Figure 3C:
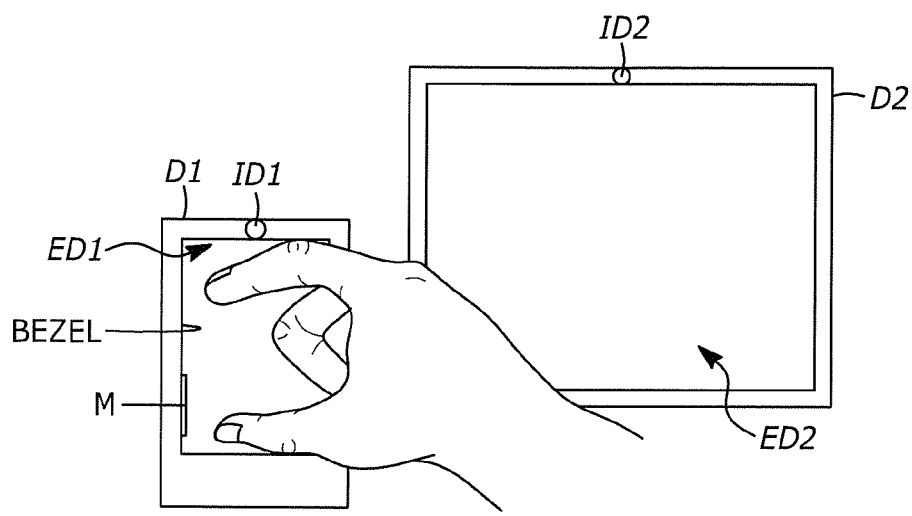
Figure 4:
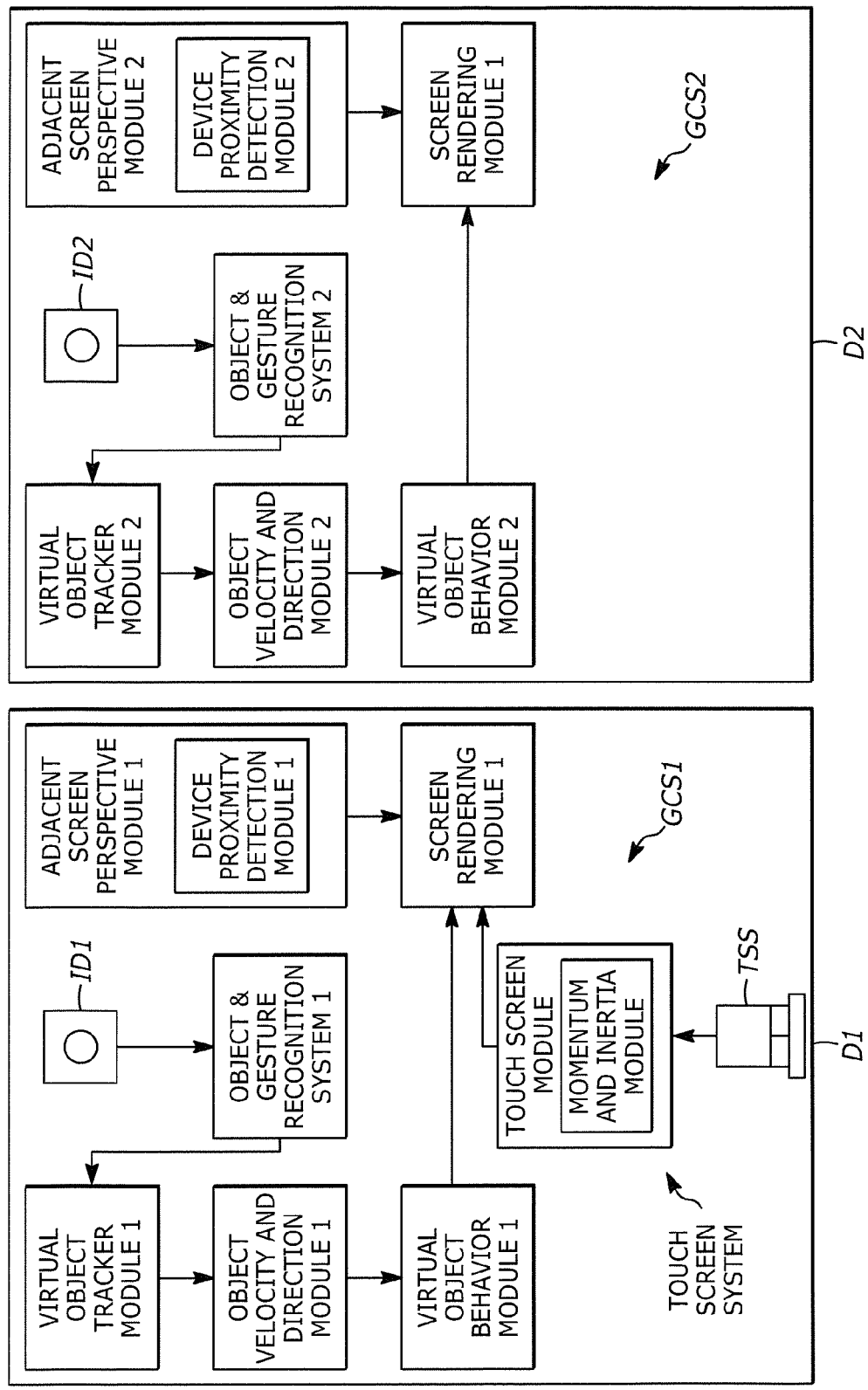
FIG. 4 shows a diagram of an embodiment of the first display and the second display shown in FIG. 1a-1h or 2a-2d, including functional modules.

Referring now to FIG. 4 in conjunction with FIGS. 1a-1h, FIGS. 2a-2d and FIGS. 3a-3c, each of D1 and D2 may incorporate a gesture capturing system (GCS1 and GCS2) as shown. Each GCS may include one or more processors in order to effect the functions to be described below. In each of D1 and D2 as shown, there exists an image detector ID1/ID2, and a bundle of input data processing modules, which include an Object and Gesture Recognition Module 1/2, a Virtual Object Tracker Module 1/2, an Object Velocity and Direction Module 1/2, and a Virtual Object Behavior Module 1/2. Each bundle of modules in the shown embodiment also includes an Adjacent Screen Perspective Module 1/2 and a Screen Rendering Module 1/2. The Adjacent Screen Perspective Module 1/2 may include a Device Proximity Detection Module 1/2. The contribution of each of the modules within the bundle of modules in each GCS 1/2 will be explained below. The Object and Gesture Recognition Module 1/2, the Virtual Object Tracker Module 1/2, the Object Velocity and Direction Module 1/2, the Virtual Object Behavior Module 1/2, the Adjacent Screen Perspective Module 1/2 and a Screen Rendering Module 1/2, the Adjacent Screen Perspective Module 1/2 and the Device Proximity Detection Module 1/2 may be representative of hardware, software, firmware or a combination thereof.

Referring first to the image detector ID 1/2, the ID may include, for example, one or more 3D depth sensing cameras, or an optical detection array infused behind a visible display and outer bezel. For example, the bezel of one of the devices may contain IR emitters and an IR receiver to allow position tracking of user gestures. The ID may for example be adapted to capture air movements of a user's body part in the form of images, and to feed such input data to the Object and Gesture Recognition Module.

The Object and Gesture Recognition Module may be adapted to recognize and track hand and harm gestures of a user, and its general implementation is currently part of the state of the art. Such a module may be used to recognize hands, fingers, finger gestures, hand movements and a location of hands relative to displays. For example, the Object and Gesture Recognition Module could for example determine that a user made a body part gesture to drop or throw the VO onto ED1 or ED2, or that the user made a body part gesture to move the VO to a bezel of D1 or D2.

The Virtual Object Tracker Module on the other hand may be adapted to track where a VO should be located in three dimensional space in a vicinity of an electronic display, such as ED1 or ED2 for example, and which body part of the user is holding the VO, based on input from the Object and Gesture Recognition Module. The Virtual Object Tracker Module 1 and Virtual Object Tracker Module 2 may for example both track a VO as it moves from ED1 toward ED2, and they may track which body part of the user is holding that VO. Tracking the body part that is holding the VO allows a continuous awareness by one or more GCS' of the body part's air movements, and thus an eventual awareness by one or more GCS' as to whether the VO has been released onto either ED1 or ED2 as will be further explained below. In addition, where a user's body part may interact with a display to create a virtual binding, the Virtual Object Tracker Module may be adapted to track such bindings as the body parts move in the air, which tracking may be correlated with input from the Adjacent Screen Perspective Module to be described in the paragraph below. In addition, when the Virtual Object Tracker Module determines that the user's body part holding a VO is positioned beyond an ED, such as ED1, and either that no additional ED's are in the VO's trajectory, for example, the Virtual Object Tracker Module may send an input directly to the Screen Rendering Module to show a map view that includes a representation of the surrounding area. The map view is a virtual representation of objects saved within a device that may not normally be shown on the display, such as objects saved within the bezel area, and can be virtually pulled out of the bezel area (for example by virtually pulling out a marker next to the bezel area) to be observed. The map thus provides visual feedback when manipulating a VO along a plane and assists the user in selecting a destination target during manipulation beyond the physical ED or between multiple ED's when traveling in virtual space.

The Adjacent Screen Perspective Module, which may include the Device Proximity Detection Module, may be adapted to determine an angle of the screen of one display relative to a screen of another display, such as a relative angle of the screen of ED1 to the screen of ED2, for example if the Adjacent Screen Perspective Module is Adjacent Screen Perspective Module 1, and vice versa if the Adjacent Screen Perspective Module is Adjacent Screen Perspective Module 2. For example in the embodiment of FIGS. 1a-1h and 2a-2d, where D1 is a smartphone and D2 is a personal computer, Adjacent Screen Perspective Module 2 in D2 may be adapted to detect the presence of D1, and to use an analysis of images of the VO originating from ED1 to determine an angle of D1's screen relative to D2's screen. Such detection of screens and angles of displayed areas through software that detects the shape of light emitted from projected display is part of the state of the art. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photodetection sensing capability. For technologies that allow projected displays with touch input, software currently exists that analyzes incoming video to determine the position of a projected display and to correct for the distortion caused by displaying at an angle. In the case of embodiments, use of an accelerometer could for example allow determining the angle at which a device, such as D1, is being held while infrared could allow determination of orientation of the device D1 in relation to the sensors on the adjacent device D2. According to embodiments, using such software, the Adjacent Screen Perspective Module, D2 may determine coordinates of D1's screen relative to its own screen coordinates. Thus, the Adjacent Screen Perspective Module may determine which devices are in proximity to each other, and further potential targets for moving one or more VO's across screens. The Adjacent Screen Perspective Module may further propose target landing or release zones for the VO on the target screen, for example in the form of a shadow on ED2 if the VO is being moved from ED1 to ED2.

The Object and Velocity and Direction Module may be adapted to estimate the dynamics of a VO being moved, such as its trajectory, velocity (whether linear or angular), momentum (whether linear or angular), etc. by receiving input from the Virtual Object Tracker Module. The Object and Velocity and Direction Module may further be adapted to estimate dynamics of a virtual binding if one is used, by for example estimating the degree of stretching of the virtual binding, and its dynamic behavior once released by a user's body part. In the latter case, the Object and Velocity and Direction Module may build on existing software and hardware that tracks user interaction with 3D images that appear to be coming out of a screen. For example, gesture detection in conjunction with a BiDi (Bi-Directional) screen has already been proposed in prototype technology developed at the Massachusetts Institute of Technology. See http://web.media.mit.edu/~mhirsch.bidi. The Object and Velocity and Direction Module may also build on existing modules that use image motion, size and angle changes to estimate the velocity of objects, such as the velocity of hands and fingers, which modules are currently used in games, such as, for example, in games utilizing the Softkinetic Iisu™ SDK by the Softkinetic Corporation. See http://www.softkinetic.net/Solutions/iisuSDK.aspx. According to one embodiment, for example, such software may be used to compensate for and/or determine the shape of a VO or of a virtual binding to be defined below, correcting for a geometry of a virtual image according to an angle and direction of a source display with respect to a target display.

The Virtual Object Behavior Module is adapted to receive input from the Object and Velocity and Direction Module, and to apply such input to a VO being shown in the display. Thus, for example, the Object and Gesture Recognition System would interpret the input from the image detector ID by mapping the captured movements of a user's hand to recognized movements, the Virtual Object Tracker Module would associate the VO's position and movements to the movements as recognized by Object and Gesture Recognition System, the Object and Velocity and Direction Module would capture the dynamics of the VO's movements, and the Virtual Object Behavior Module would receive the input from the Object and Velocity and Direction Module to generate data that would direct the movements of the VO to correspond to the input from the Object and Velocity and Direction Module.

The Screen Rendering Module is adapted to receive the data from the Virtual Object Behavior Module, and to render the VO and/or virtual bindings on a screen such as ED1 or ED2 in a manner consistent with such received data. Thus, the data from the Virtual Object Behavior Module would determine the position and dynamics of the VO and or associated virtual binding, for example, and the Screen Rendering Module would depict the VO and/or associated virtual binding on an ED accordingly. The Screen Rendering Module could further be adapted to receive data from the Adjacent Screen Perspective Module to either depict a target landing area for the VO if the VO could be moved to the display of the device with which the Adjacent Screen Perspective Module is associated. Thus, for example, if the VO is being moved from ED1 to ED2, Adjacent Screen Perspective Module 2 could send data to Screen Rendering Module 2 to suggest, for example in shadow form, one or more target landing areas for the VO on ED2 that track to a user's hand movements.

As further shown in the embodiment of FIG. 4, the GCS1 of D1 may also include a Touch Screen System 1, such as a conventional Touch Screen System, which may include a touch screen sensor TSS. Data from the TSS may be fed to a Touch Screen Module which may comprise hardware, software, firmware or a combination of the same. The Touch Screen Module may take the data from the TSS, for example to map the touch gesture of a user's hand on the screen to a corresponding dynamic behavior of a VO. The Touch Screen Module may for example include a Momentum and Inertia Module that allows a variety of moment behavior for a VO based on input from a user's hand. The use of a Momentum and Inertia Module is well known. For example, a Touch Screen System associated with the iPad product manufactured by the Apple Corporation generates a scroll momentum of one or more VO's on the iPad screen based on a swipe rate of a user's finger relative to the screen. The Touch Screen Module according to an embodiment may for example be adapted to interpret certain hand interactions of a user with respect to a screen, such as, for example, a pinching gesture, which may be interpreted by the Touch Screen Module to indicate the user's wish to lift the VO from the display screen, and/or to begin generating a virtual binding associated with the VO, as will be explained with respect to FIGS. 1a-1h and 2a-2d further below. For example, to differentiate between a zoom command, which in a current Touch Screen System typically involves moving the thumb and forefinger of a hand close together while those fingers are touching a screen in question, and a pinch and lift command to pinch and lift a VO from a screen, the Touch Screen Module could for example be adapted to interpret a gesture as a pinch and lift command where the thumb and forefinger of a user's hand are brought more closely together than a zoom gesture.

Although the shown embodiment of FIG. 4 depicts each device as incorporating an image detector, and various software modules for mapping input data from the image detectors to control input, embodiments are not so limited. Thus, for example, D1 and D2 could be adapted to process input data from a shared image detector (not shown), or from a shared image processing system (not shown) including an image detector coupled to an Object and Gesture Recognition Module, a Virtual Object Tracker Module, an Object Velocity and Direction Module and a Virtual Object Behavior Module, for example, this processing system being shared as between D1 and D2 to move the VO from ED1 to ED2 (FIGS. 1*a*-1*h* and 2*a*-2*d*). In addition, although FIG. 4 depicts D1 as including a Touch Screen System, embodiments encompass within their scope the incorporation of a Touch Screen System in both D1 and D2, or in none of D1 and D2.

Figure 6:
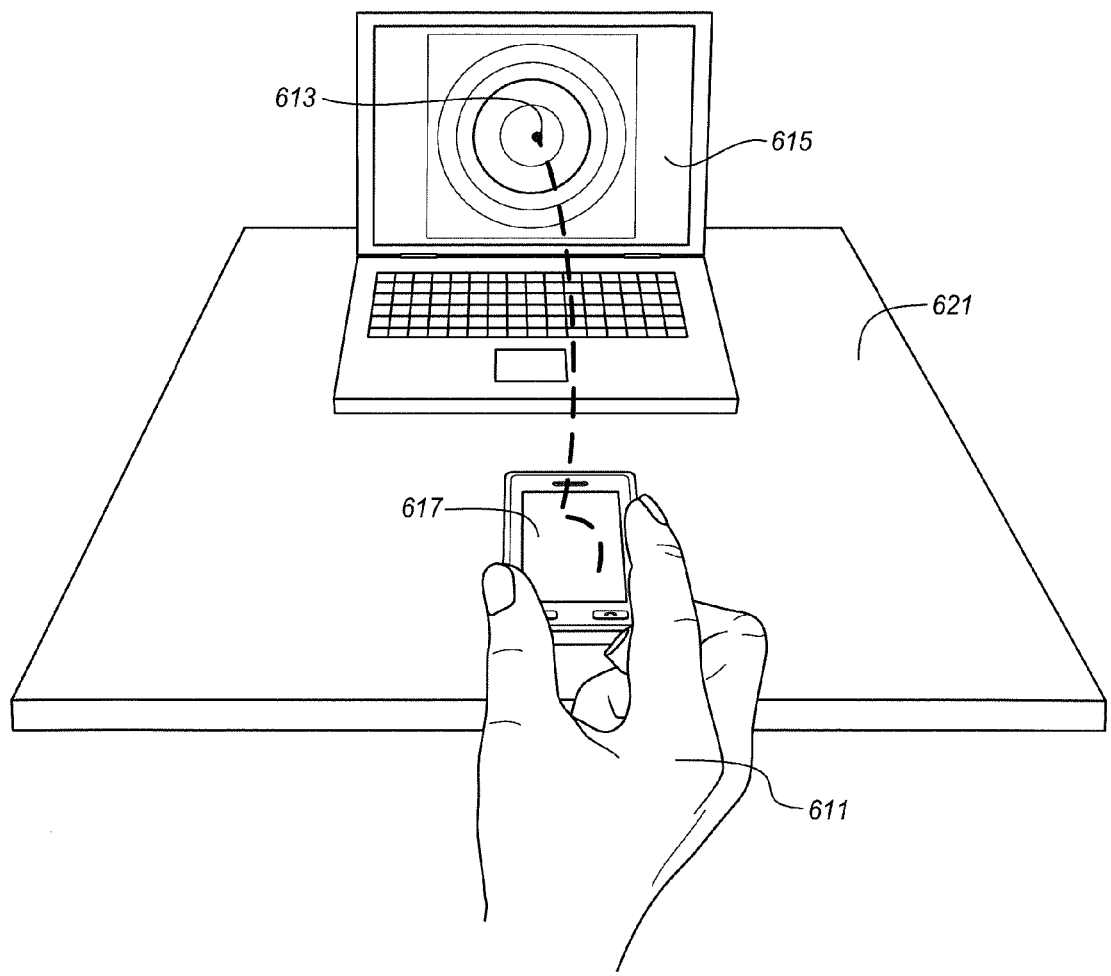
FIG. 6 illustrates a process to bounce a virtual object from one screen to another according to an embodiment.

Referring first to the example of FIGS. 1*a*-1*h* and to FIG. 4, an embodiment is depicted where: (1) a virtual object VO may be acquired from the screen of first electronic display ED1 belonging to first electronic device D1, virtually picked up by a user's hand, moved over to a location closer to the screen of second electronic display ED2 belonging to second electronic device D2, and then virtually released onto the latter screen; and (2) VO may be acquired from the screen of ED2 and virtually moved back to the ED1. The examples described above may be enhanced with additional user interaction. In one example of the invention, a user virtually bounces a virtual object from one display to another. In FIG. 6 a user 611, holding a virtual object 613, shown as a simple dot, has thrown the virtual object toward a large display 615 of a computer, or other device. As shown by the dotted line trajectory of the virtual object, the virtual object has first bounced off of a smaller first display 617. The smaller display may be a media player, smart phone, slate computer, notebook computer, or a display of a desktop or all-in-one machine. Dedicated gaming devices may be used as well. The virtual object strikes the first display and may interact with displayed objects on the main display. It may also bounce back to the first display. The apparatus described above allows for gestures, object positions, and physics of the virtual objects interactions to be generated and tracked.

The second display 615 and the first display 617 are shown as resting on a table 621. This arrangement is portable and easy to set up. The particular support is not important to the invention. The principles discussed herein may be applied to devices on the floor or a park bench or to an entertainment or theater room in which the second display is for a television or projector and the first display is a full desktop computer. Many desktop and notebook computers accept touch input and are available with or may be equipped with a camera and microphones for air gestures and voice commands. The first display may also be handheld to allow interaction with a larger display without any table at all.

To implement the interactions of FIG. 6, the Virtual Object Tracker Module of FIG. 4 tracks the virtual object from the user's hand, to the smaller first display, and then to one or more other displays. The Adjacent Screen Perspective Module determines the virtual path of the virtual object. This allows the game to provide virtual bouncing across screens. Users may throw or otherwise launch objects to bounce off many different surfaces. The Virtual Object Tracker Module determines that the virtual path of the object should be in a trajectory from the first display to the second or vice versa.

Figure 7:
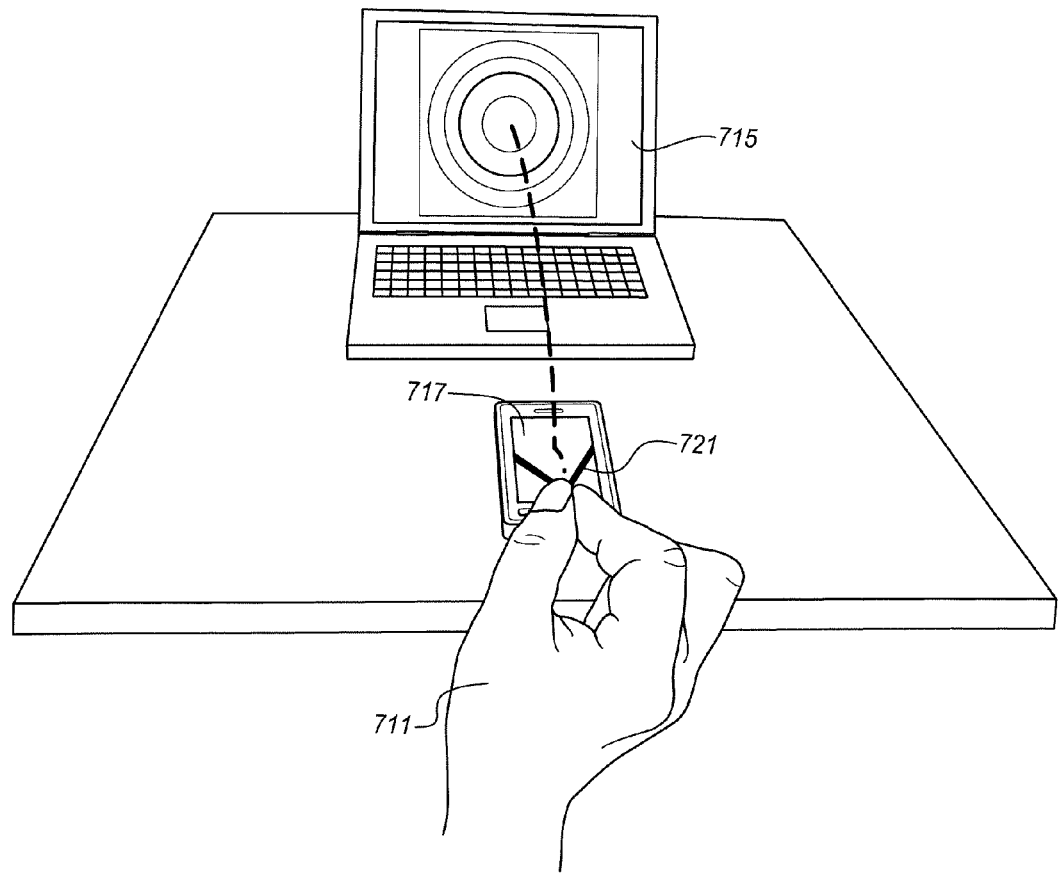
FIG. 7 illustrates a process to bounce a virtual object using virtual bindings from one screen to another according to an embodiment.

In another example, the virtual object may be a projectile launched with virtual bindings from one screen to another. In FIG. 7, a user 711 orients a handheld device 717 toward a larger display 715. The user then draws back the virtual object against virtual bindings 721. The virtual object is released to virtually bounce off the first display and be launched toward the large display 715. In this example, the first display is resting on a table, but as with FIG. 6, the first display may be handheld and the system of two displays may be configured in many different ways.

The two displays may share a single computing resource or may both have independent computing resources and communicate with each other using local area networking or dedicated communications protocols. In one example, a second computing system supporting the first display, such as a smart phone processor, tracks the progress of the operations of selecting a virtual object and inputting user gestures to launch the object toward the second display. At that point the second computing system then passes parameters to a first computing system supporting the second display. The second display then represents the virtual object and its interaction with real and virtual objects on and near the second display. The parameters may be passed via a direct wireless connection, over a network, or in a variety of other ways. In a game environment, control over the game can pass between the devices or one device can control the game while the other device serves only as a user input device, such as a game controller. The parameters sent from the first display may be values for basic variables, such as the position and trajectory of the virtual object, to insert into the game software driving the first display.

Figure 8:
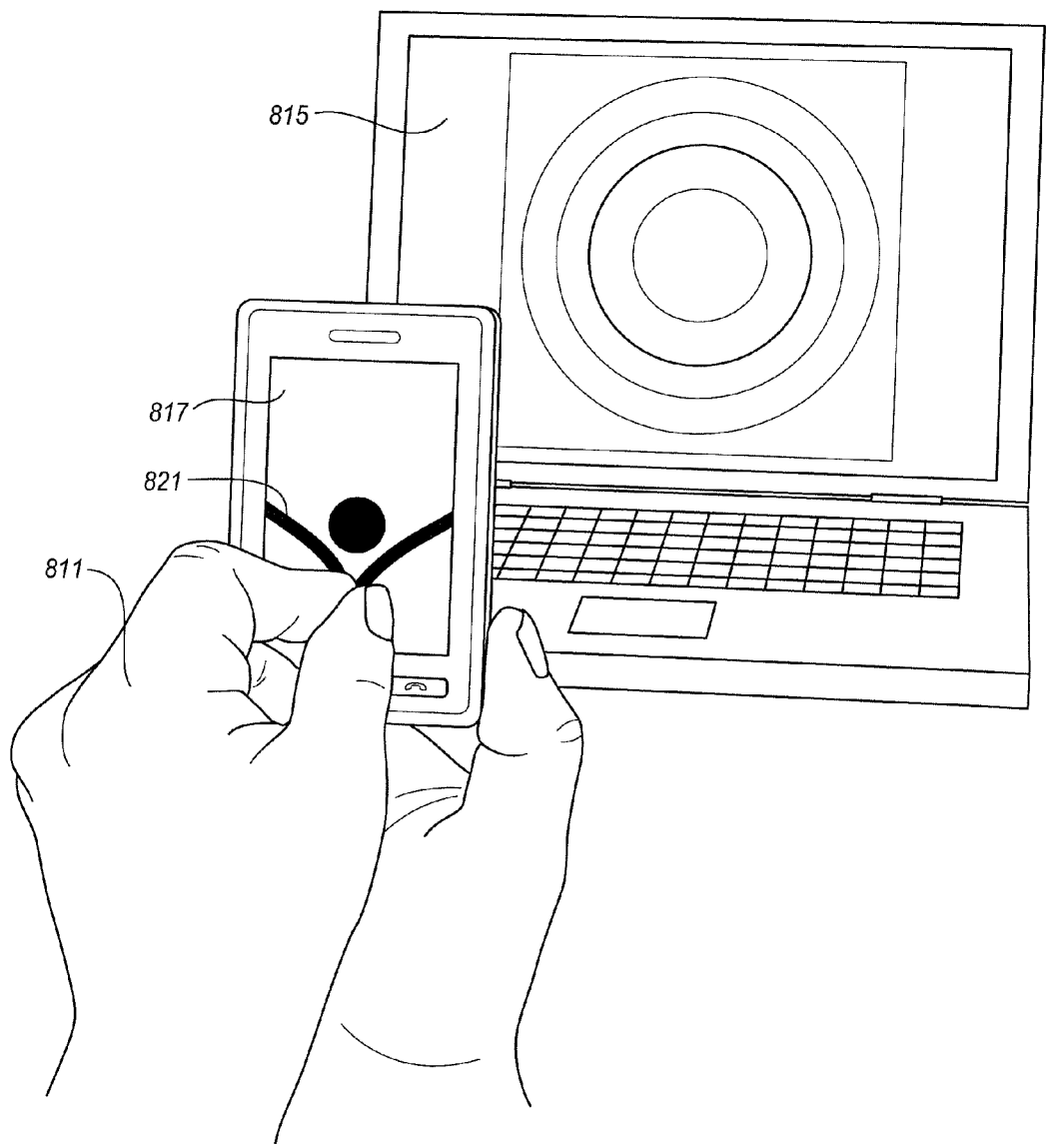
FIG. 8 illustrates a process to sling a virtual object using virtual bindings from one screen to another according to an embodiment.

In another example shown in FIG. 8, the first display 817 shows a virtual bindings user interface in this case in the form of a slingshot. Here the user 811 pulls back the virtual bindings 821 and orients the first display with respect to a second display 815. Upon releasing the virtual bindings, a virtual object concealed by the user's hands is launched toward the second display. The trajectory of the virtual object is determined based on the user touch gesture on the virtual bindings and the relative positions of the two displays. The Adjacent Screen Perspective Module of FIG. 4 determines the relative positions of the two screens and provides this information to the Object Velocity and Direction Module so that the trajectory can be tracked by the Virtual Object Tracker Module.

As compared to the example of FIG. 7 in which the virtual object is launched with the bounce on the first display that is then impacted by the virtual bindings, in the example of FIG. 7, the virtual object is actually shown on the display and launched from that view. In all three examples as shown in FIGS. 6, 7, and 8, the position of the first display may be used as a factor in determining the trajectory of the virtual object. In all three examples, the first display may show a reflection of the user to enhance the sense of interactivity of the user interface.

In all three examples, the user may select virtual objects to be launched with the touch screen. The virtual objects in these examples behave as projectiles and different objects may exhibit different physics effects depending on the type. A projectile may be propelled, it may have drag, it may change course due to other virtual forces, such as wind, gravity, virtual bats or virtual guns, etc. The selection of the virtual object may be performed by selecting from a predetermined and pre-programmed list of choices or a virtual object may be configured by the user.

In one example, the user scans a real object and then uses that object in the virtual world. The object may be any scanned object, animal, or person and may be actual or taken from a picture or drawing. The user may scan things nearby, pictures nearby, or access previously taken pictures. The user may then be allowed to configure the new virtual object with physical and physics properties, such as size, mass, drag, etc.

In some embodiments, the selection of the virtual object may automatically invoke a particular type of virtual binding. The virtual binding may be activated automatically or by the user depending on the implementation. The selected projectile is then launched using the virtual binding. Virtual binding may be used to represent a slingshot, a catapult, a throwing or pitching arm, or a variety of other launching devices, both real and imagined.

As in the examples of FIGS. 1, 2, and 3, and in the virtual binding scenarios, the user may use voice commands to change the nature of the object to be launched (color, category, capabilities) or change the nature of how it is launched or change the view that appears on the displays before and after launching the object. Alternatively, secondary gestures or eye tracking may be used to influence the targeting and the physics of the virtual object. All of these inputs may be accepted and processed before, during, or after launch of the virtual object. These effects may all be received by the Object and Gesture Recognition System and even by cameras and microphones for eye tracking, voice tracking and direction of attention.

Figure 9:
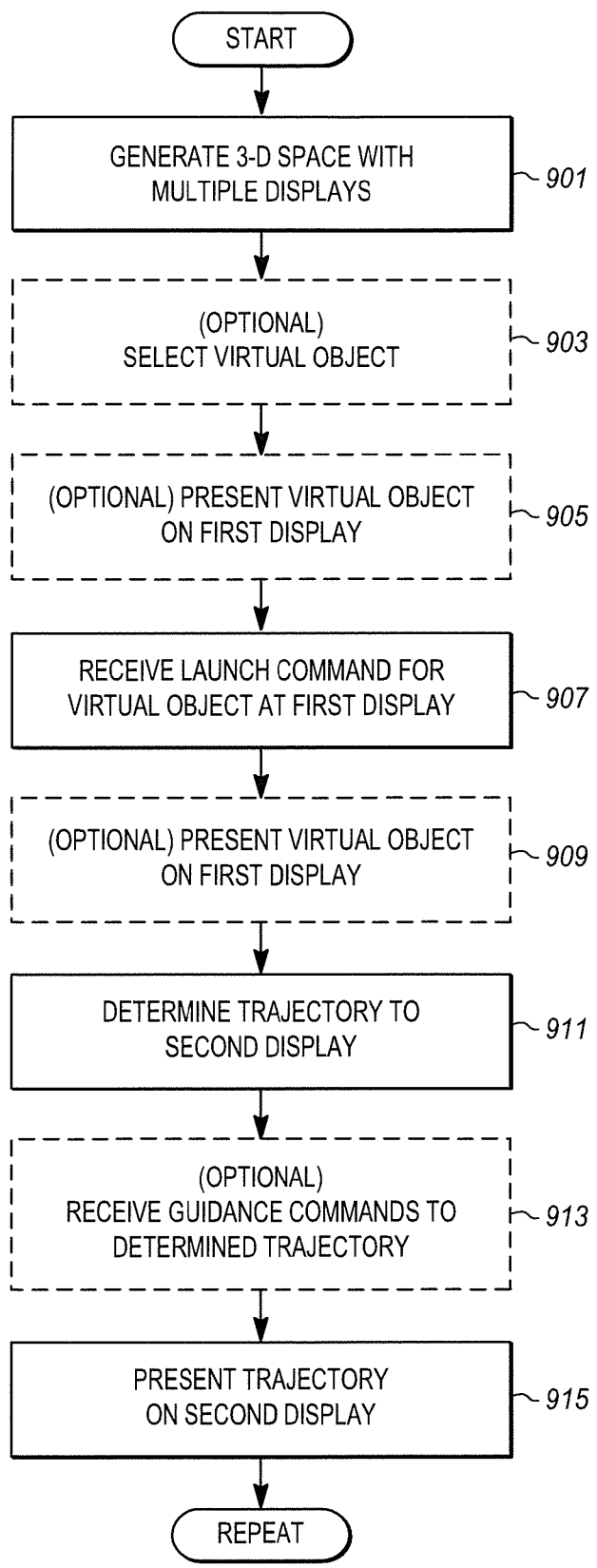
FIG. 9 is a flow diagram of another method embodiment.

The examples of FIGS. 6, 7, and 8, are shown as a simplified process flow in FIG. 9. At 901, the process starts and a three-dimensional space is generated. This space includes the two displays and any other real or virtual objects. The three-dimensional relationship between the two displays is determined and included in the space. The determination may be made using resources associate with either or both displays or with other processing resources.

At 903, a virtual object is selected for use in the virtual 3-D space. The virtual object may be selected based on a list of virtual objects presented on the first or second display. The user then makes a selection using a command to select a virtual object before launching the object. Virtual objects may also be selected by presenting a selection of virtual objects on the display based on observing objects in the real space. These objects may be nearby objects or previously observed objects. The system may generate a representation of at least one observed real object and then, based on that representation, generate a virtual object. The generated virtual objects may then be presented as a selection of virtual objects on the first display. The operation at 903 is optional and may be replaced by default or predetermined selections.

At 905 the virtual object may optionally be presented on the display. This may be a representation of the virtual object or a shadow of a virtual object with a virtual location off the screen as described above. At 907, a launch command is received to launch the virtual object from or off the first display. The command may come in many forms, including touch screen gestures, such as a touch screen motion performed on the first display to launch the virtual object from the first display, or an air gesture. The gesture may be a throwing motion to throw the virtual object at the first display. The throwing motion may be performed on the touch screen or within view of a camera associated with the first display. Since the object is virtual, there will be a spatial relationship between the virtual position of the virtual object and the position of the gesture. This can be used in presenting the virtual object on the first display before receiving the launch command and in presenting the virtual object on the first display after receiving the launch command. The gesture may also be presented on the first display and a view of the virtual object and the spatial relationship to the gesture.

At 907, the virtual object may be presented on the first display as well as the gesture. Although this operation is not necessary, it may improve enjoyment or accuracy in launching the virtual object.

At 911, the trajectory of the virtual object from the first display toward the second is determined. This determination can take into consideration the user gesture to launch the virtual object, the interaction with any virtual bindings in launching the object, the nature of the object and how it is to travel, and the nature of the 3-D space into which the object is launched, such as virtual paths or roads, weather, other objects, etc.

At 913 guidance commands may be received from the user to guide the virtual object on its way to the second display. The guidance commands can be performed by performing gestures on a screen, in the air or with the first display directly such as by tilting or shaking the display. The guidance commands are applied to modify the determined trajectory and may include steering, velocity, acceleration, pitch, roll, and yaw commands. In one example, the guidance commands include user gestures determined by observing a user. The user can command using a direction in which his face is pointed, a direction in which his eyes are pointed, and a direction of the voice of the user. These can all be determined using cameras and microphones.

At 915, the virtual object is presented on the second display. This allows the virtual object to be launched from the first display sent to the second display and then sent back to the first display or to another display or to stop travel at the second display. The interaction of the user is improved by using two different displays.

Figure 10:
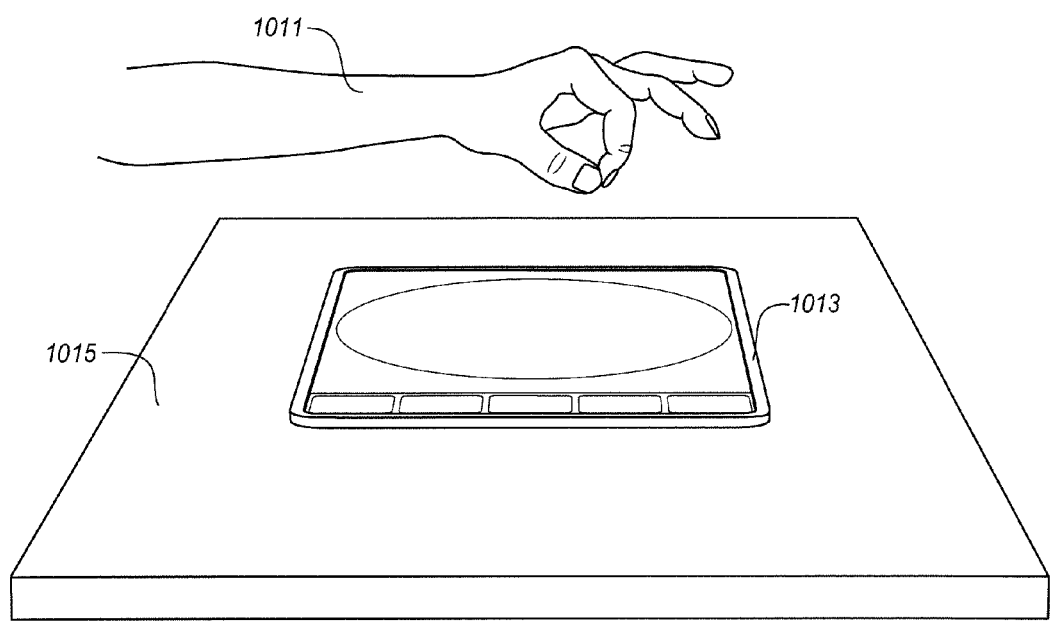
FIG. 10 illustrates side view of dropping a virtual object on to a screen according to an embodiment.

FIG. 10 shows a side view of how virtual reflections of the user can be used to enhance the interaction of a user with a computing device. In the example of FIG. 10, there is a single display, however, the interaction may also be used with the dual screen examples described above.

The first example below shows a game concept, "Cowboys and Goldfish." In this game the user 1011 selects a cowboy character by pinching the screen and virtually lifting the cowboy character off the screen. The user then moves his hand to an advantageous position to drop the cowboy on a goldfish. The goldfish may be a moving target to enhance the difficulty of the game. The displayed cowboys and goldfish may be animated to make various movements and noises to entertain the user. The system may track the user's hand during and after lifting the virtual character, using various sensors, including but not limited to: a touch screen; a screen with embedded photonic sensors; one or more 2D cameras; and a 3D camera.

In FIG. 10, the user lifts cowboys off of a display 1013 that is resting on a table 1015. Sensors associated with the display observe the user's movements to create the game play. In FIG. 10, the user's hand is shown as holding a virtual object, such as a virtual cowboy and ready to drop, throw, flick, bat, or shoot the virtual object toward an object displayed on the screen. While, all of the sensors and computing resources may be a part of the tablet or smart phone 1013, external sensors and processing resources may be used instead of or in addition to those of the illustrated display.

Figure 11:
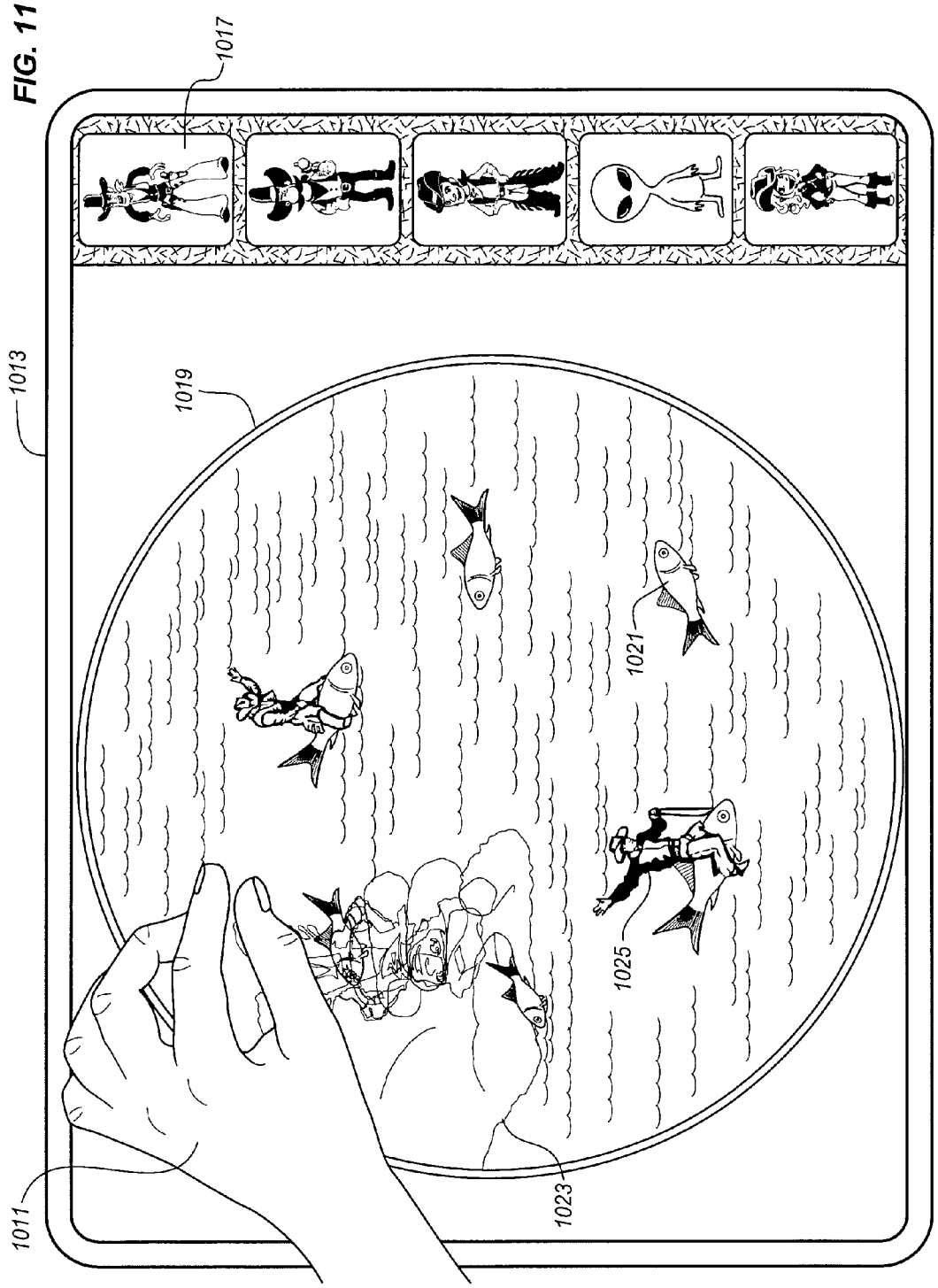
FIG. 11 illustrates a top view of dropping a virtual object on to a screen according to an embodiment.

In FIG. 11, the screen display of FIG. 10 is shown. Goldfish 1021 are swimming in a fish bowl 1019. The user 1011 is presented with a selection panel 1017 of different characters to be used in the game, such as different cowboys. After selecting a character using, for example, a touch screen gesture, the user may then lift the selected character from the screen as shown and then try to drop the cowboy 1025 onto one of the goldfish 1021.

Upon lifting the character, a virtual object corresponding to the character is generated and may be shown on the display. The display presents the virtual object as a reflection 1023 of the virtual object and the user's hand. This reflection is presented as a reflection off the water at the top of the goldfish bowl 1019. In order to provide a more realistic effect, the reflection ends at the edge of the fish bowl. The same principles may be applied to other displayed reflective surface, such as glass, metal, other types of water surfaces, clouds, etc. Similarly, the cowboys and goldfish are provided as an example, any of a variety of other characters and objects may be presented as options to launch at any other type of object or character. Typical examples include bombs and submarines, darts and targets, birds and worms, or any of a variety of different imaginary military and spaceship targets.

Using the sensors, the screen is able to show various virtual views of the user's hands and objects and characters from the game that the hands virtually contain. In the Cowboys and Goldfish example, the user is virtually holding a cowboy and sees a reflection in the water that shows the hand holding a cowboy.

Figure 12:
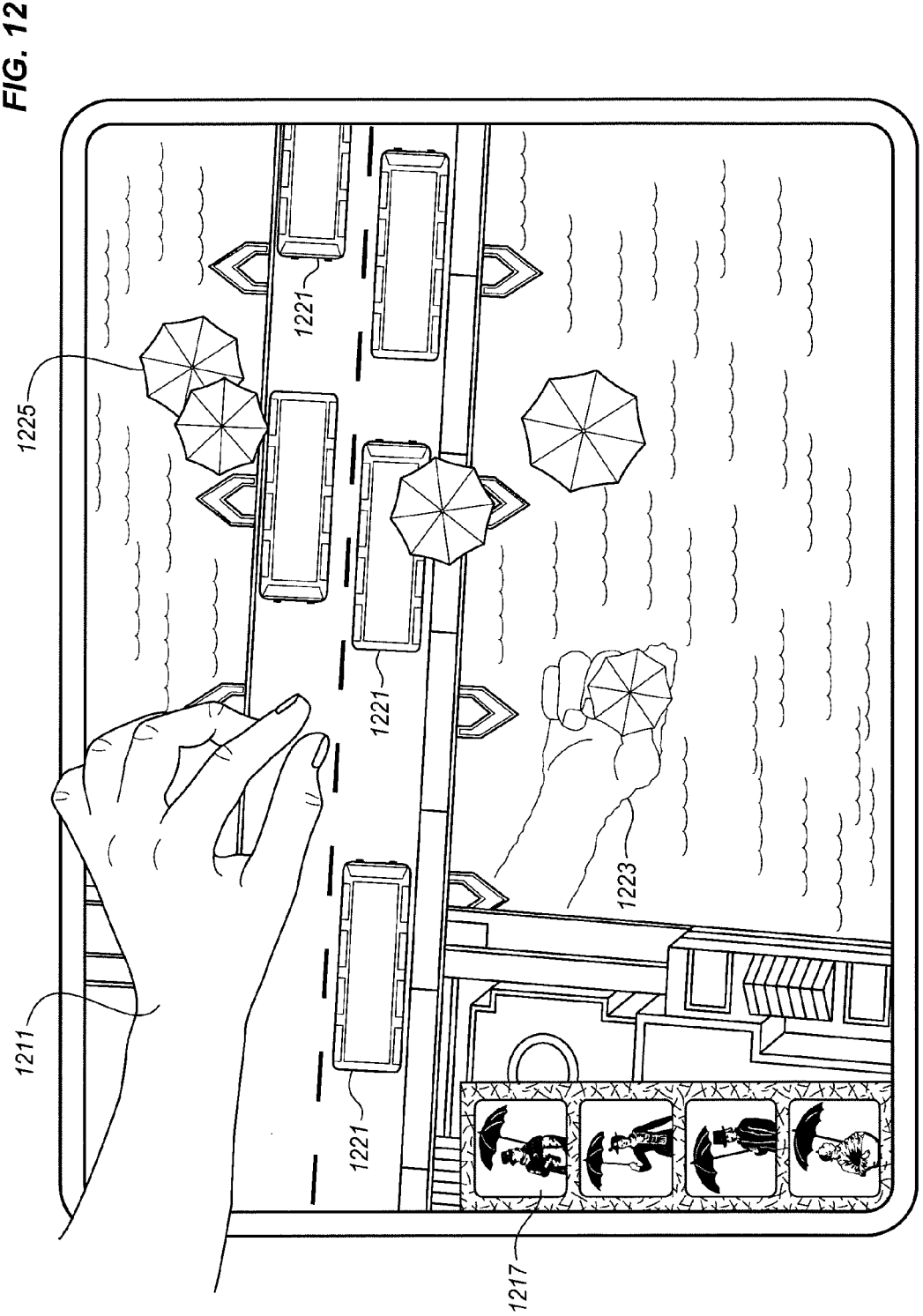
FIG. 12 illustrates top view of dropping a virtual object on to a screen according to another embodiment.

The same techniques may be applied to characters with parachutes or umbrellas being dropped onto a scene. The example of FIG. 12 shows a game in which the user tries to virtually drop characters 1225 onto moving buses 1223. The buses are moving across a bridge over a river. The water provides a surface upon which reflections may be rendered. The dropped characters float down using umbrellas as parachutes. As in the previous example, in the top view of FIG. 12 the hand (holding a character) is virtually reflected in the water. The screen rendering module based on the selected virtual object and observations of the user generates a reflection 1223 of the user and the virtual object. This allows the user to see possible effects of dropping or throwing the character in a particular direction. The user's actual hand 1211 is also shown for reference to see how the reflection 1223 of the hand relates to the rendered reflection in the water.

The virtual reflection can be created in any of a variety of different ways. In one example, the hand can actually be captured as an image, and the character from the game can be added to create a composite image. The hand can be detected and differentiated from the visual field of incoming Elements may then be added to the captured image. In another example, using the approximate position of the hand, the system can display a hand model that matches the position of the real hand.

Figure 13:
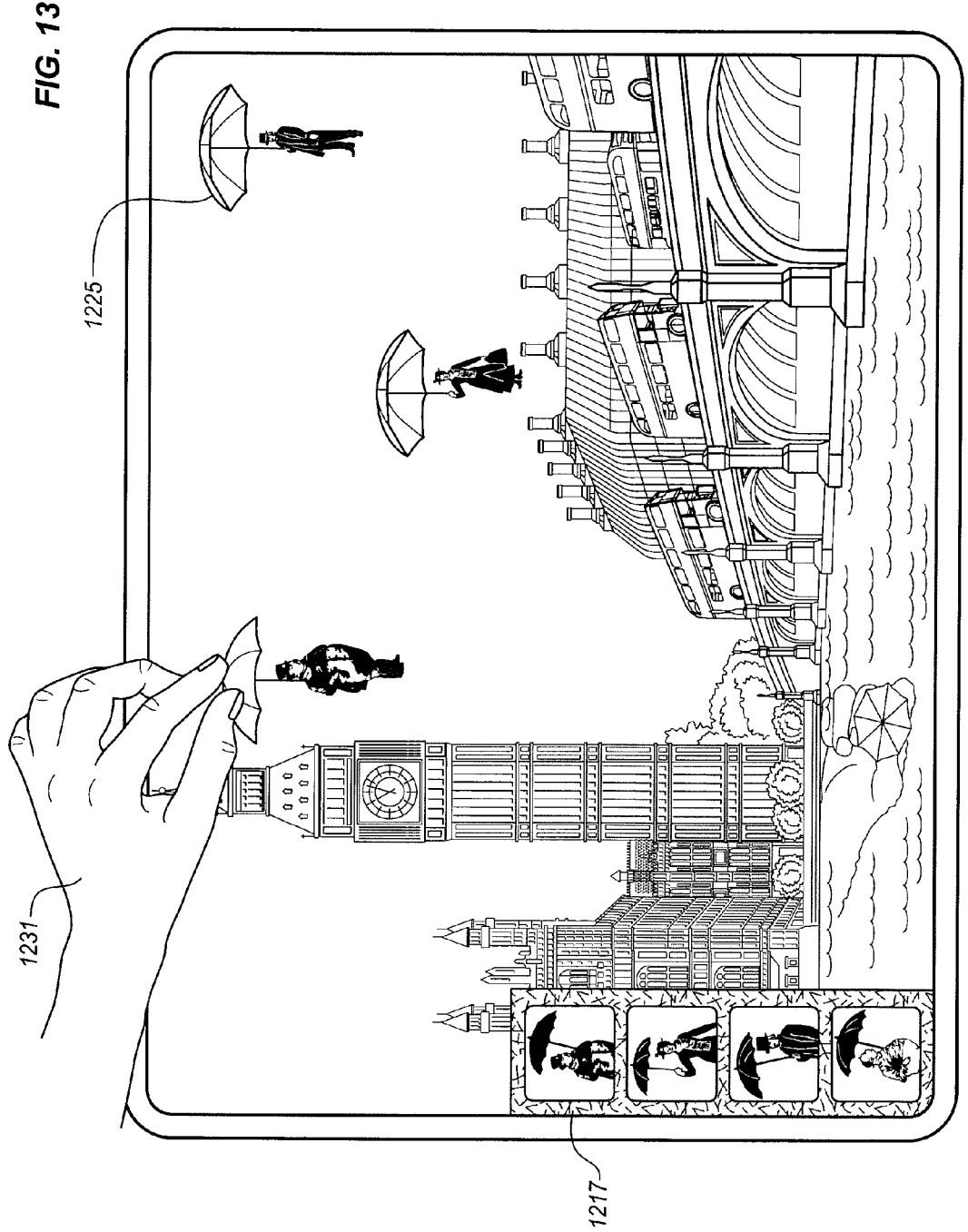
FIG. 13 illustrates a side view of dropping a virtual object on to a screen according to the FIG. 12 embodiment.

The side view of this game is presented in FIG. 13 showing the same user as a virtual hand 1231 in the sky holding a character. This view may be presented on a second screen as an optional view on the same screen or as a split screen with the view of FIG. 12. The user interaction may be enhanced with additional and alternative displays not shown here. The example displays are provided as examples and many other views may be presented to a user. In the displays of FIGS. 12 and 13, multiple released objects are shown floating simultaneously.

In another embodiment, one screen is used to create, edit and select an object or object attribute on one screen before throwing the object at another screen. The user can edit or build characters on the touch screen and then launch them toward another display, either by air-gesturing a pickup and throw toward a second screen or by using a gesture on the touch screen to gesture the launch. Further, the direction and tilt of the first screen, such as a tablet, may be used to determine an aim of an object.

Figure 14:
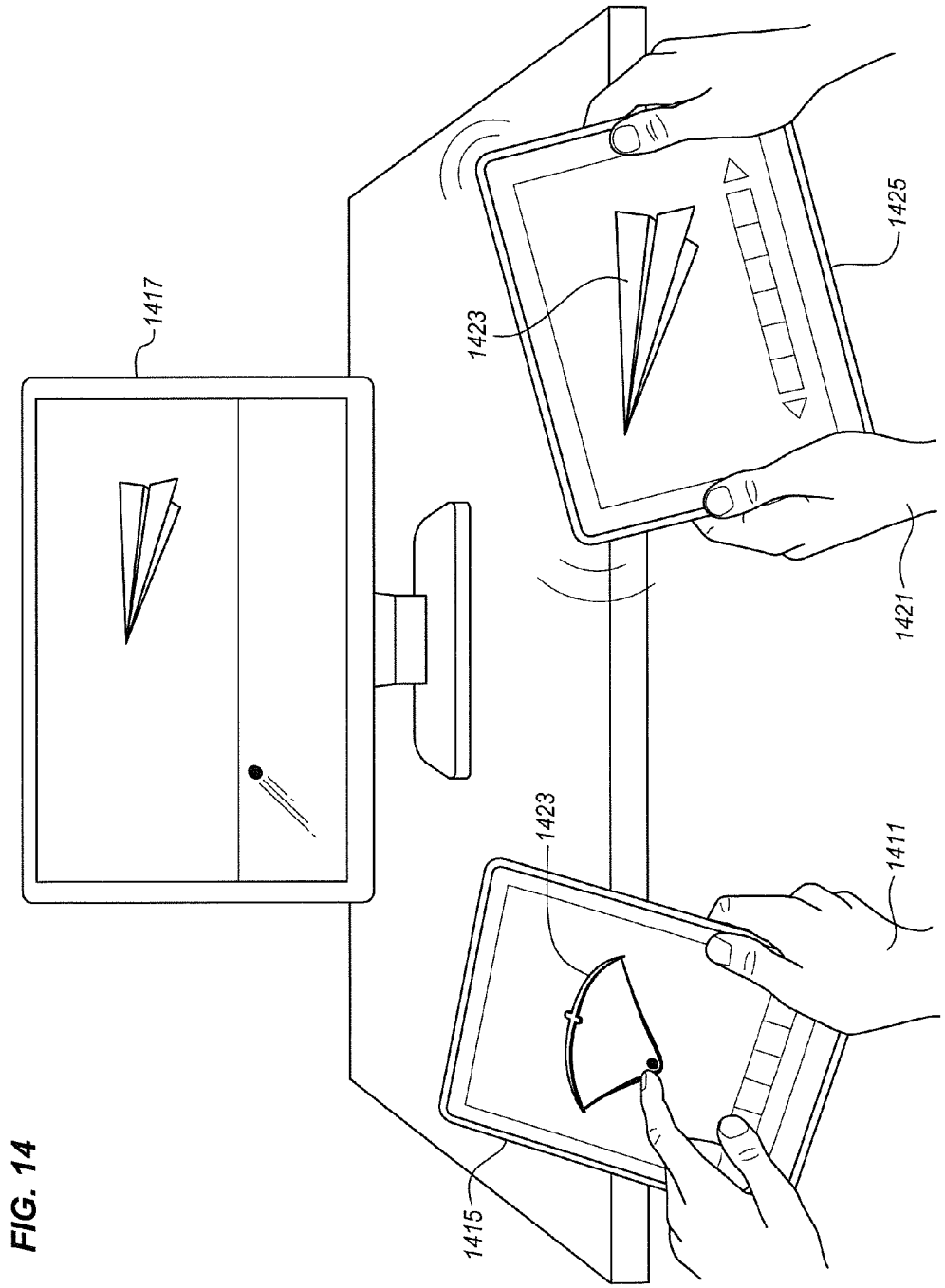
FIG. 14 illustrates a first user launching a character from a tablet to a TV screen using a crossbow-like control.

Referring to FIG. 14, a first user 1411 launches a character from a tablet 1415 to a TV screen 1417 using a crossbow-like control 1413. Another user 1421 folds paper airplanes 1423 using a touch screen of another tablet 1425. The second user then launches the paper airplane toward the TV screen 1417. Multiple players can make and virtually throw objects in competitive or cooperative games. Further, after launching the virtual object toward the main screen 1417, the player can use the tablet as a controller to maneuver the plane as it flies on the second screen. While FIG. 14 focuses on two screens, three or more screens may be used for various versions of such games.

The embodiments described above allow for a multi-step method to enable games to be played using touch on one device to edit an object then virtually launch it to another screen. In one embodiment an IR (Infrared) emitter and receiver combination may be used to detect the aim of the user. An accelerometer in the tablet may be used to detect tilt, in order to determine changes in a trajectory of the launched object. Other interactions may alternatively be used. For example, using the tablet as a steering wheel to drive a road presented on the tablet.

Such interaction may also be used with a virtual fly fishing interaction. In his case, the user might define a rod and configure a fly on a smaller handheld device. The user could then use the device as the rod to cast the fly toward the larger screen.

The example above integrates z-axis gesturing with x-y plane touch screen interactions to create, select, and edit a virtual object. Feedback is provided using augmented reality reflections on the screen during the z-axis gestures that are linked to inputs to the touch screen. The touch screen input or air gesture input allows characters to be selected and tracked on a nearby display. The characters may then be used to generate augmented reality representations on one or more screens.

Using both touch screen input and z-axis or air gestures as inputs allows a representation of the user's hand and any virtual objects or characters that have been selected with the touch screen to be shown. A user may use a touch screen to select an object, followed by a gesture to throw that object toward another screen. Cameras associated with one or more of the screens possibly on different devices or external to all of the screen devices track the throw gestures or other gestures. In addition to the throw or launch, the tilt of a handheld device may be used to control an object as it moves toward another screen.

Figure 15:
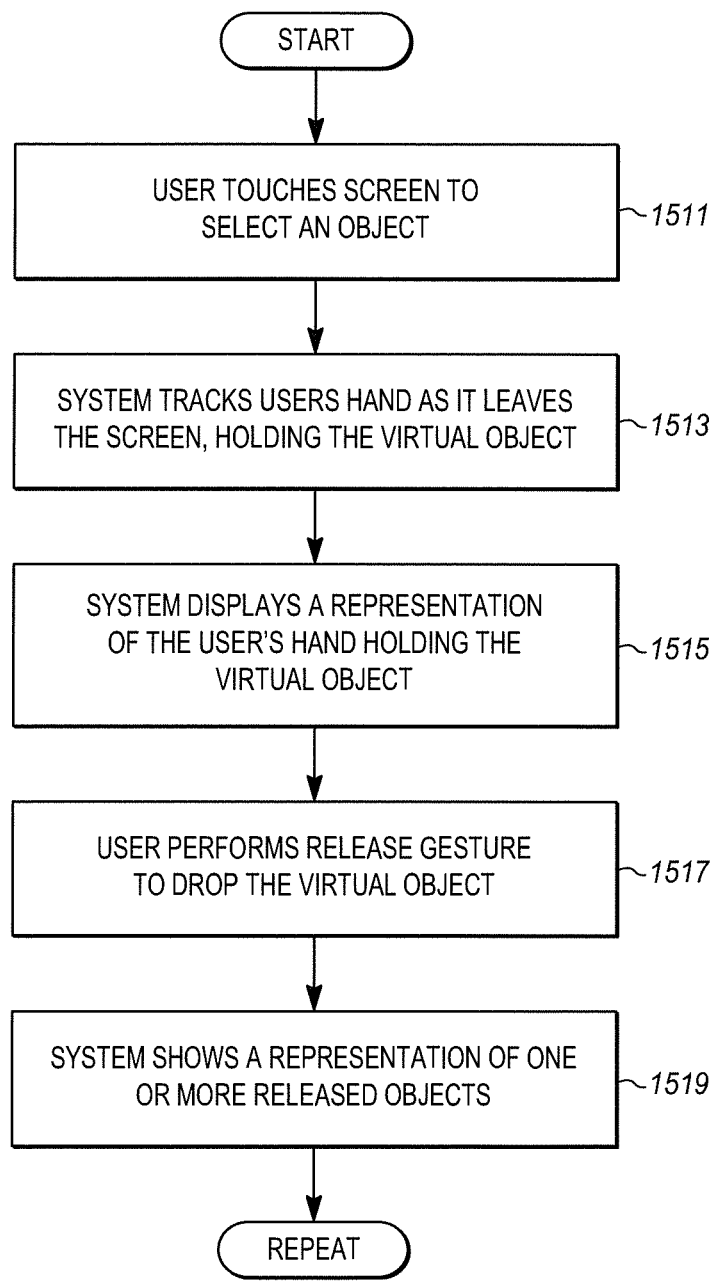
FIG. 15 is a flow diagram of another method embodiment.

FIG. 15 is a process flow diagram of some of the described techniques combined into a single process flow. At 1511, the process starts and the user touches a screen to select an object. Alternatively, keypad or controller buttons may be used to select the object. The object may be a character, such as a cowboy, or an inanimate object, such as a paper airplane.

At 1513 the system tracks the user's hand as it leaves the touch screen holding the virtual object. This may be done using sensors attached to the touch screen or attached to any of a variety of other devices. After generating a representation of the user and the virtual object, the system may then display a representation of the user's hand holding the virtual object. This representation may be presented as a reflection or an alternate view of the virtual object and the user. While the examples above show a user's hand and perhaps an arm, if other body parts are used for air gestures, then those other body parts may alternatively be shown, such as feet for a soccer game.

At 1515, the user performs a release gesture to drop the virtual object or otherwise launch the virtual object. A variety of different examples are provided above, such as throwing, batting, or shooting the object. Virtual bindings may be used and a variety of different inertial and acceleration effects may be applied to the virtual object.

At 1517, the system shows a representation of one or more released objects on the relevant screens. Examples of these are the cowboys and umbrella parachutes described above. After the representations are generated and displayed, the process may return to launch more virtual objects.

Figure 1B:
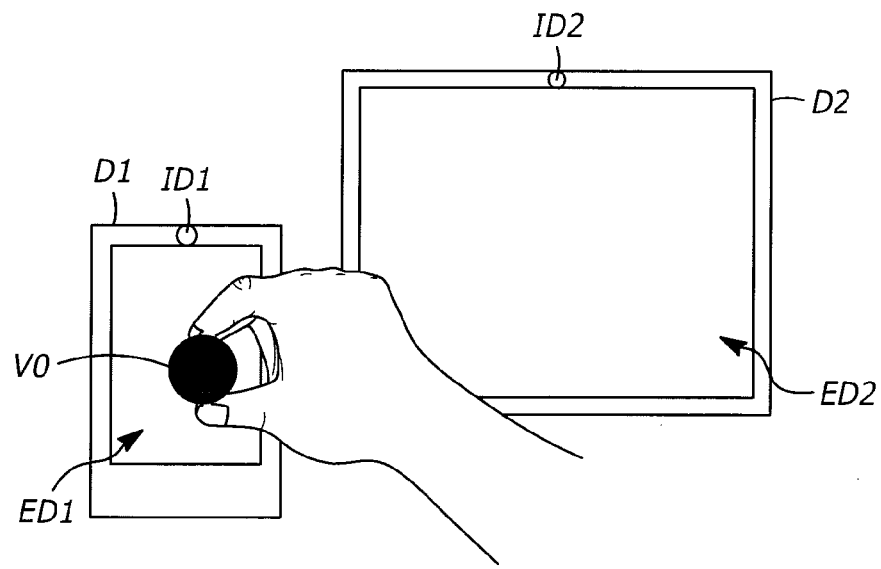
Figure 1C:
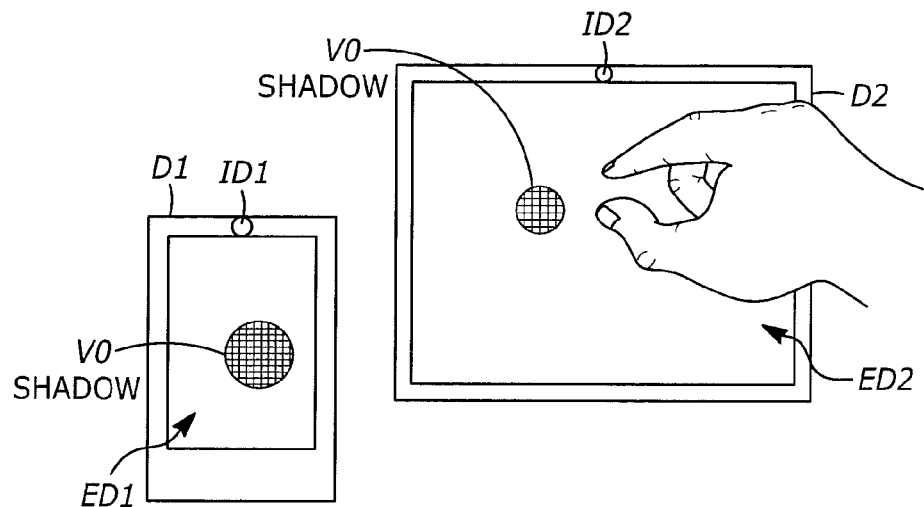
Figure 1D:
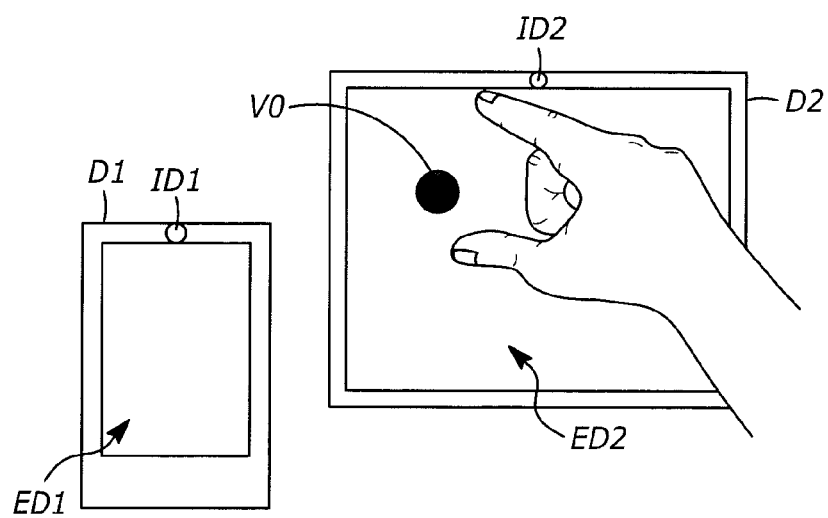
Figure 1E:
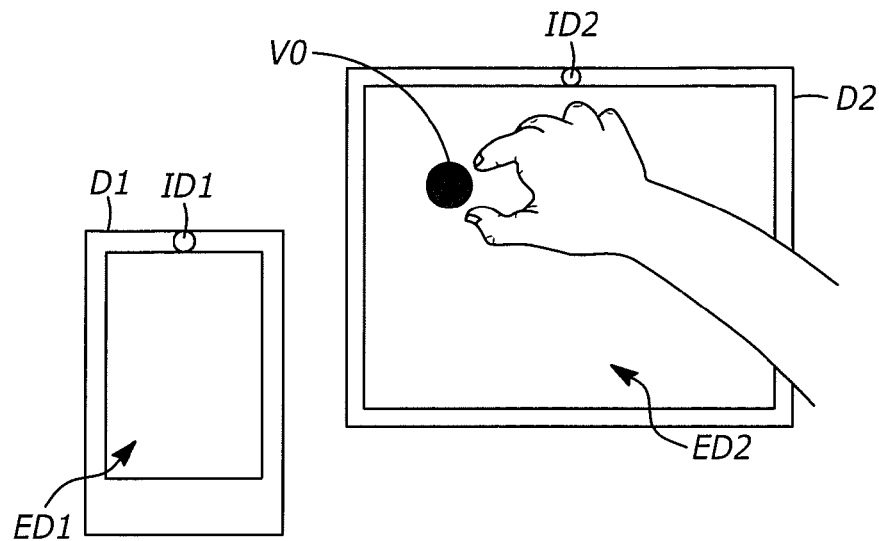
Figure 1F:
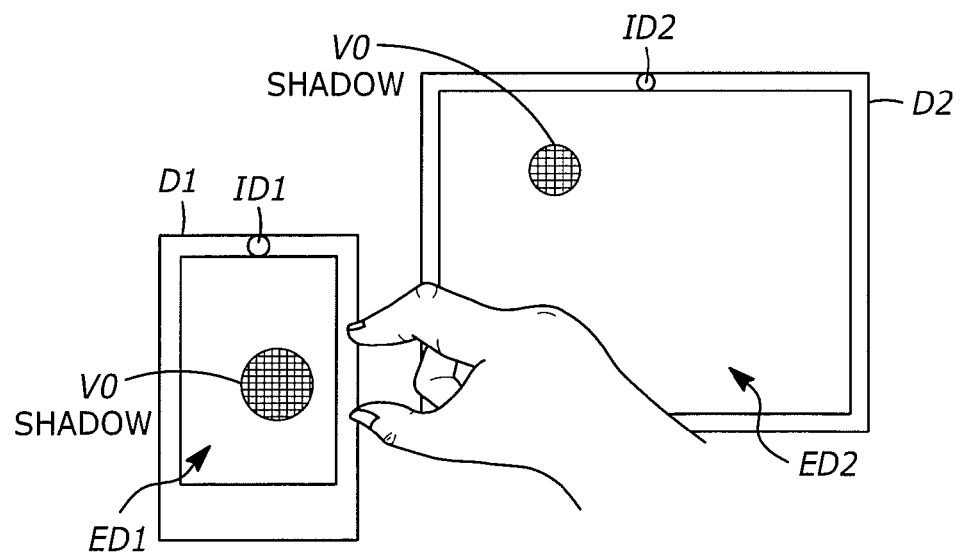
Figure 1G:
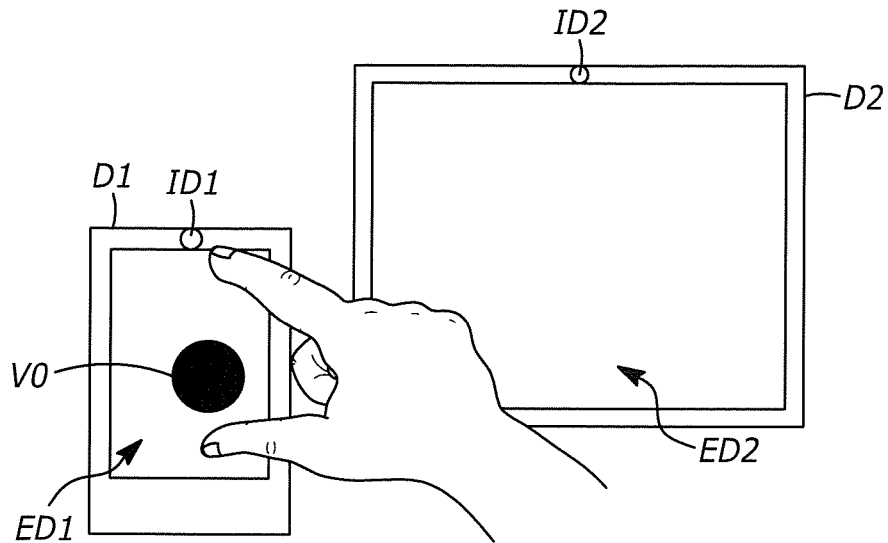
Figure 1H:
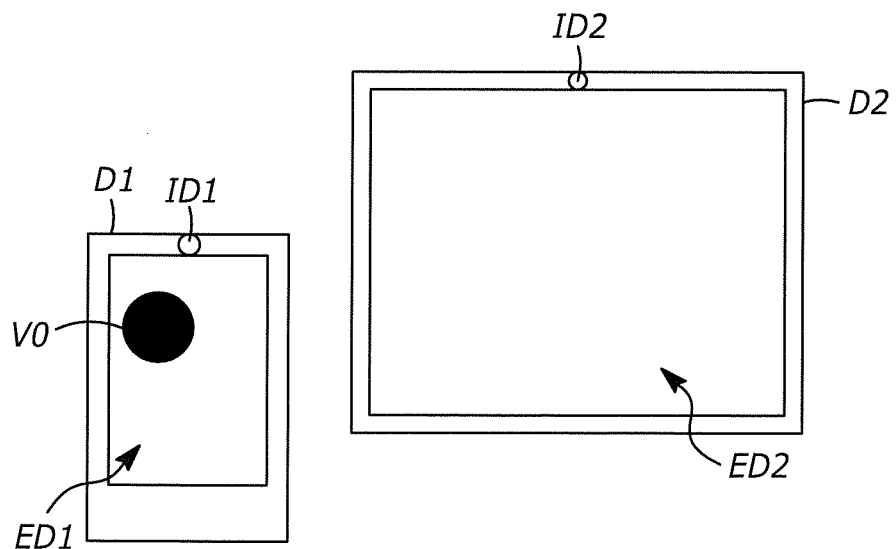

Referring first then to FIG. 1*a*, a virtual object VO appears on the screen of ED1 of device D1, which in this embodiment comprises a smartphone device as previously noted. The user's hand is shown in FIG. 1*a* as moving toward VO, and as being about to pinch and lift it from ED1. Referring next to FIG. 1*b*, the user's hand is shown as pinching VO in order to acquire it, virtually, between its thumb and finger, through a touch screen pinch gesture. The Touch Screen Sensor System of FIG. 4 may be active at this point to sense and interpret the interactions between the user's hand and the screen of ED1. Referring next to FIG. 1*c*, the user's hand is depicted as still virtually holding the VO, having moved the same to a location over the screen of ED2, that is, over the screen of the notebook display. At least from the time the user's hand leaves its contact position with respect to the screen of ED1, ID1 or ID2 or both track its air movements interacting with the VO, using GCS1 and/or GCS2 as described with respect to FIG. 4 above. Thus, by the time the user's hand is disposed over the notebook display ED2, a shadow of the VO may be shown in ED1 at the location where the user's hand acquired the same, and a shadow of the VO may be also shown in ED2 at an optional target release location of the VO on ED2 before the VO is actually moved to ED2. Referring next to FIG. 1*d*, the user's hand is shown as making a pinch-release gesture, which may be captured by ID2 in order to effect a virtually release of the VO onto ED2 as shown. As a result of the release gesture, the VO, with underlying properties and data, is effectively moved from D1 to D2 by way of being moved from ED1 to ED2. Referring next to FIG. 1*e*, the user's hand is shown as being disposed close to the screen of ED2 in order to re-acquire VO on ED2. In the depiction of FIG. 1*e*, the user's hand makes a air pinching gesture, which may be captured by ID1 or ID2 or both as an acquiring gesture with respect to VO. Referring next to FIG. 1*f*, the user's hand is depicted as still virtually holding the VO, having moved the same to a location over the screen of ED1, that is, over the screen of the smartphone display. By the time the user's hand is disposed over the notebook display ED2, a shadow of the VO may be shown in ED2 at the location where the user's hand acquired the same, and a shadow of the VO may be also shown in ED1 at an optional target release location of the VO on ED1 before the VO is actually moved to ED1. Referring next to FIG. 1*g*, the user's hand is shown as making a pinch-release gesture, which may be captured by ID2 in order to effect a virtually release of the VO onto ED2 as shown. As a result of the release gesture, the VO, with underlying properties and data, may be effectively moved back from D2 to D1 by way of being moved from ED2 to ED1. Referring next to FIG. 1*h*, the VO is shown as having moved from its release location, by virtue of intertia capabilities of GCS1 (FIG. 4) associated with D1, which effects a continued movement of the VO across the screen of ED1 based on the dynamics of the user's hand release gestures and virtual properties of the VO. Throughout the process as depicted in FIGS. 1*a*-1*h*, GCS1 and GCS2 as described with respect to FIG. 4 may be active to track the user's hand movements to effect a movement of the VO beyond a given display.

Figure 2A:
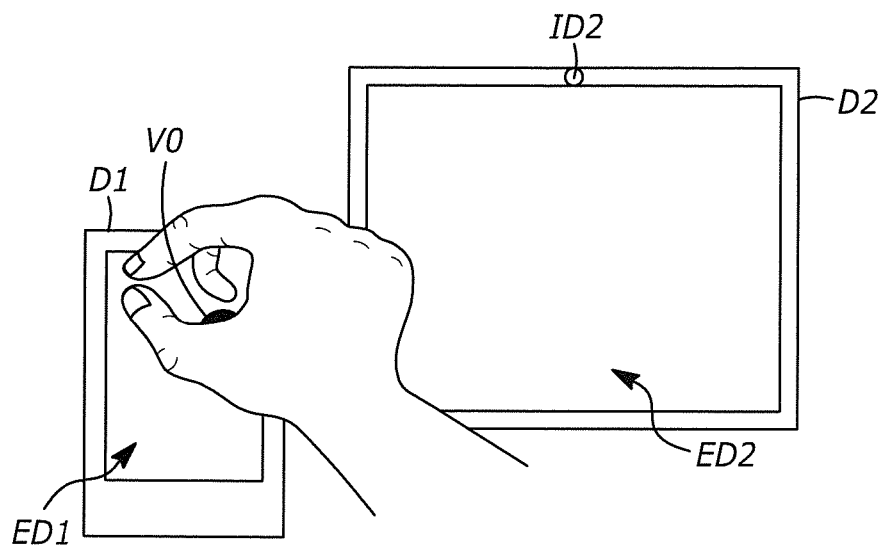
FIGS. 2a-2d illustrates a process to move a virtual object across screens according to a second embodiment.
Figure 2B:
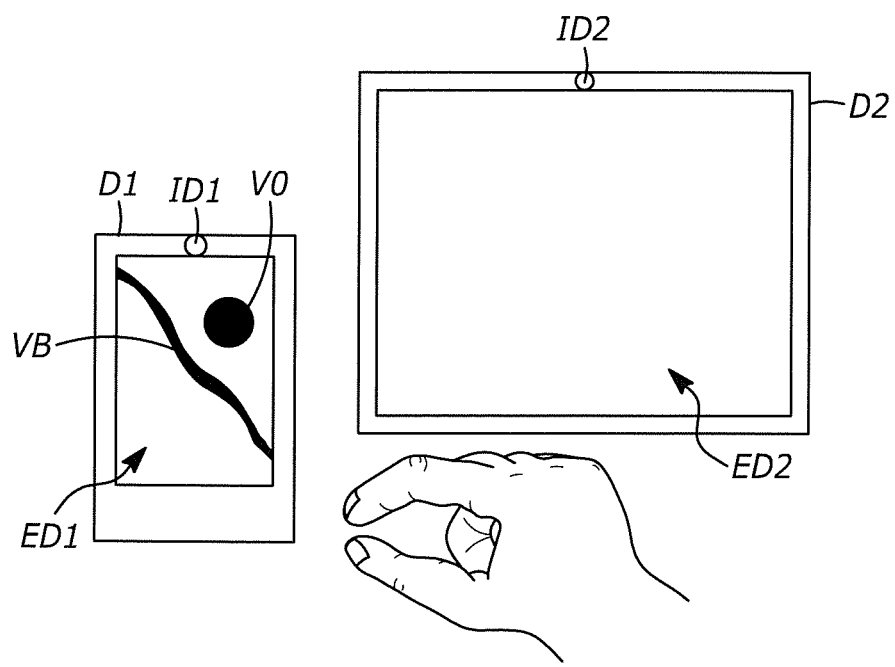
Figure 2C:
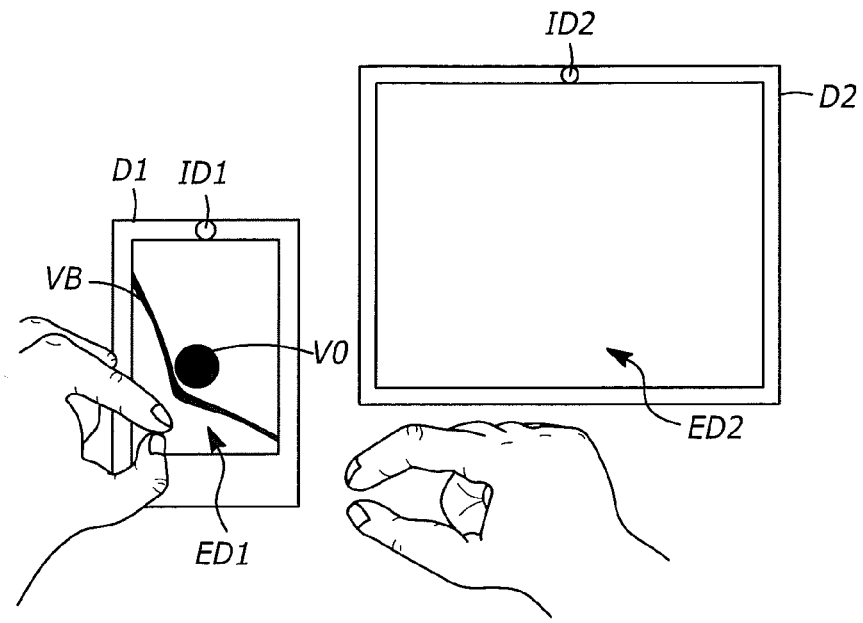
Figure 2D:
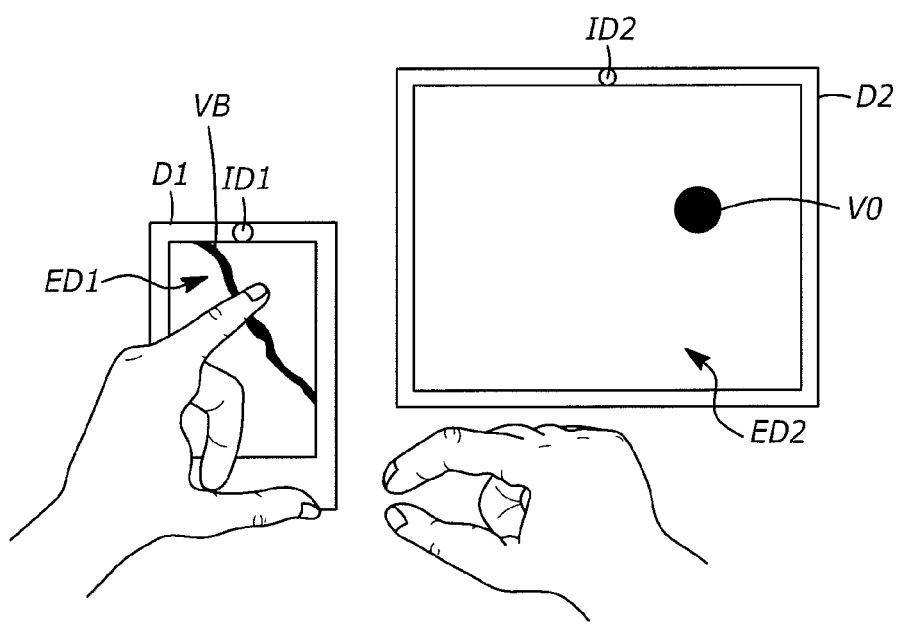

Referring next to FIGS. 2*a*-2*d*, another embodiment is depicted where a user's hand or hands are effective to create a virtual binding on an electronic display that may be effective to move a VO from the display to another display. As depicted in FIG. 2*a*, a user's hand may pinch on a screen, for example at a corner thereof, and, as depicted in FIG. 2*b*, the user's hand may then move the pinched fingers back from the screen of ED1, at which time a virtual binding virtual binding may appear to protrude from the screen of ED1 as shown, enhanced with 3D. As shown in FIG. 2*b*, and as explained above, a virtual binding may comprise a 3D virtual tether between the fingers and the VO being manipulated. A virtual binding may thus provide a simulation of motion memory with respect to a user's body part movements, being critical in providing visual feedback to the user regarding the user's movements. A virtual binding may for example appear in the form of one or more virtual tethers or a virtual wall. A virtual binding may for example be embodied as a cross-bow or a sling shot, or having a shape of any other virtual object that may be used to move an object from one virtual location to another. Referring next to FIG. 2*c*, the user may intercept the virtual binding with the other hand, by for example making a pinching gesture with respect to the same as shown. Such an interaction with the virtual binding may cause the virtual binding to bend, and hence to for example pull VO toward itself as the virtual binding stretches toward to the user's other hand. Thus, interaction with the virtual binding may cause changes to the characteristics of the virtual binding, such as its dynamic properties (kinetic energy, target direction, etc). Referring next to FIG. 4*d*, the user's other hand is seen as effecting a releasing gesture with respect to the virtual binding, which, in the shown example, causes the VO to appear now on ED2 according to inertial properties of the same. Throughout the process as depicted in FIGS. 2*a*-2*d*, GCS1 and GCS2 as described with respect to FIG. 4 may be active to track the user's hand movements to effect a movement of the VO beyond a given display.

Referring next to FIGS. 3*a*-3*c*, an alternative embodiment is depicted, where a VO is moved beyond an electronic display by being moved to a bezel region of a screen. By "bezel," what is meant in the instant description is a region that is at the rim or edge of a display. A VO may for example be moved to a bezel of a device in the case of space constraints on the device display, or for other reasons. Referring first to FIG. 4*a*, a user's hand virtually acquires a VO between a thumb and a finger through a touch screen pinch gesture on ED1, as previously described with respect to FIG. 1*b*. Referring next to FIG. 4*b*, a user's hand may gesture the pinch fingers to a bezel region of the screen beyond ED1 as shown. Next, as seen in FIG. 4*c*, the user's hand may make a pinch-release gesture at the bezel region as shown, which gesture may release the VO in the bezel region of D1. A marker M may then show a location of the VO placed on the bezel of D1. Throughout the process as depicted in FIGS. 3*a*-3*c*, a gesture capture system similar to GCS1 as shown in FIG. 4 may be active to track the user's hand movements to effect a movement of the VO beyond ED1 and to the bezel region.

With respect to the embodiments of FIGS. 1*a*-1*h*, FIGS. 2*a*-2*d* and FIGS. 3*a*-3*c*, while only certain specific hand movements and gestures are depicted to effect corresponding desired results, embodiments are not so limited, and encompass within their scope a tailoring of the gesture capture systems to any set of gestures as applicable, whether by hand or otherwise, to effect a movement of a VO beyond a given display. For example, a VO could be batted or flicked toward another display, or a flick of the index finger from the thumb for example could denote a wish for cross-screen movement of a VO. In the alternative, to indicate that a cross-screen event is desired, a user could first enter a mode through a gesture or touch on a button on a given device. The noted embodiments may further allow a transferring of inertial properties of a release gesture to the behavior of a VO once it has been released onto a new display (such as, for example, by being virtually splattered or flattened), and, according to one embodiment, such a gesture capture system as described with respect to FIG. 4 may be adapted to allow an interaction of such a VO, based on its inertial properties, with other objects on the new screen.

In addition, with respect to the embodiment of FIGS. 2a-2d, it is not necessary for a virtual binding to be controlled by two hands, and embodiments encompass the manipulation of a virtual binding in any other manner, such as, for example, by a single hand. virtual binding could further be depicted in 3D or not, and could for example be manipulated using gestures other than those depicted in the figures, such as, for example, through shaking a hand to delete a virtual binding or cutting them with another hand. Moreover, virtual binding's and cross-display movements could occur according to an embodiment without the user having to touch the display, such as through air movements of a user's hands.

It is further noted with respect to embodiments that although the described embodiments of FIGS. 1a-1h, 2a-2d and 3a-3c pertain to using hand gestures to manipulate a VO, embodiments are not so limited, and include within their scope the use of movements of any body part(s) to manipulate a VO, and also to the use of different body parts tethered to different parts of a VO, such as through virtual bindings. The body part could include any part of a body, such as a hand, a foot, a head, eyes, legs, arms, etc.

Figure 5:
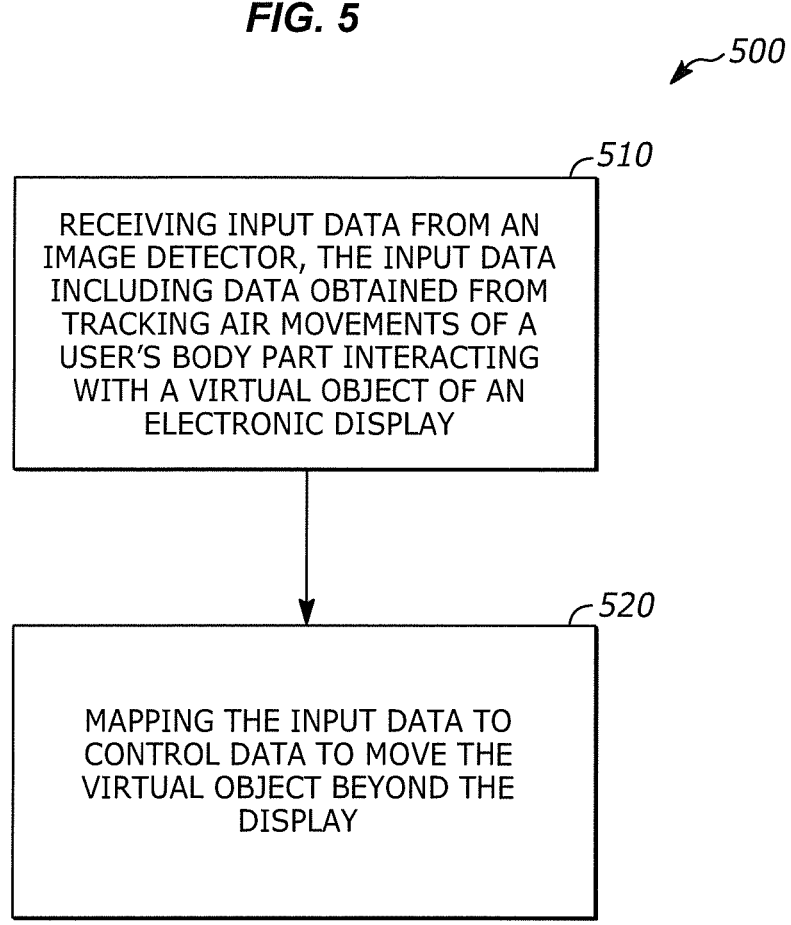
FIG. 5 is a flow diagram of a method embodiment.

Referring next to FIG. 5, a flowchart is shown for a method embodiment. According to FIG. 5, a method 500 may include, at block 510, receiving input data from an image detector, the input data including data obtained from tracking air movements of a user's body part interacting with a virtual object of an electronic display, and at block 520, mapping the input data to a control input to move the virtual object beyond the display.

Advantageously, an embodiment allows gesture recognition, such as by way of a combination of touch and air gestures, to permit a user to virtually acquire a virtual object, and to move it across screens or to a bezel region of a display. An embodiment further allows the use of gesture recognition to allow a user to virtually throw or shoot a virtual object from one screen to another screen, optionally preserving the inertial properties of the user's release movement in the dynamic behavior of the virtual object on the new screen. Moreover, advantageously, an embodiment allows gesture recognition to allow a user to control the behavior of a virtual object by making gestures through virtual bindings, especially for example, after having just having placed the virtual object on the screen through a gesture. Virtual bindings provide real-time visual feedback to link the cognitive processes and tactile expectations experienced with physical object manipulation with graphical emulations experienced virtually. For example, virtual bindings advantageously allow a virtual object to be manipulated by body part movements, such as by being moved, pushed down to be flattened or enlarged, to otherwise manipulated through a puppet-string like control. Moreover, advantageously, an embodiment allows multiple points on the same user to be bound to various elements on a display with virtual bindings (for example, a virtual binding could appear on the screen for each of multiple fingers, or for each arm and each leg, etc). The virtual objects thus bound could subsequently advantageously be controlled with coordinated gestures of the multiple points on the user.

According to some embodiments, a user may advantageously be able to bounce a virtual object from one display to another. The user could for example be holding a VO, and throw it toward a display. The VO would bounce off of the first display and then go to the other display and potentially come back to the first display. An embodiment of an apparatus already described would thus enable tracking of gestures, position, and physics of the virtual objects. In the realm of some embodiments, the user could also launch a virtual projectile from one screen to another. With a handheld device with screen, the user could draw back a VO, showing virtual binding's, then release the VO to virtually bounce off the screen of the handheld device the user is holding and toward a second display. In such a system, the user could select a VO with the touch screen (the selection could automatically move to a virtual binding to manipulate the VO, or the user could simply drag the VO, depending on the game). The selected VO could be launched as a projectile using the virtual binding. In playing games with such a system, the first system could track the progress of the game to a point then pass parameters (via direct wireless connection or over network) to the second device, which would then pick up the game from that point. In the virtual binding scenarios, the user could use voice commands to change the nature of the object to be launched (color, category, capabilities) or to change the nature of how it is launched, or to change the view that appears on the displays as the user does it. Alternatively, secondary movements such as eye tracking could be used to influence a targeting and physics of the virtual object. According to one option, a user could use the system to scan a real object then use it in the virtual world as a VO.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus, comprising:
    a touch screen module to receive touch input data from a touch screen display, the touch input data including data obtained from sensing interactions of a user with a virtual object of the touch screen display;
    a recognition system to receive air movement input data from an image detector, the air movement input data including data obtained from tracking air movements of a body part of the user interacting with the virtual object; and
    a processing module to map the touch and air movement input data to a control input to move the virtual object beyond the touch screen display.

2. The apparatus of claim 1, further comprising:
    the image detector in communication with the recognition system.

3. The apparatus of claim 1, wherein the body part is one of a hand or a part of a hand.

4. The apparatus of claim 1, wherein:
    the touch screen display is a first display; and
    the processing module is to map the touch and air movement input data to the control input to move the virtual object from the first display toward a second display.

5. The apparatus of claim 4, wherein:
    the apparatus is a first apparatus; and
    the processing module is to determine a proximity to the first apparatus of a second apparatus including the second display before mapping the input data to the control input.

6. The apparatus of claim 1, wherein the interactions include a pinching motion of the body part of the user with respect to a location of the virtual object on the touch screen display, the processing module to map the touch input data to the control input to pinch the virtual object from the touch screen display.

7. The apparatus of claim 6, wherein the air movements include a releasing motion of the the body part of the user with respect to target location of the virtual object on a second display, the processing module to map the air movement input data to the control input to release the virtual object onto the second display.

8. The apparatus of claim 1, wherein the processing module is to map the first touch screen input data and the air movement input data to the control input to create a virtual binding of the virtual object.

9. The apparatus of claim 8, wherein the body part of the user is a first body part, the processor to receive a third input data from the image detector, the third input data including data on air movements by a second body part of the user interacting with the virtual binding on the touch screen display, the processing module to map the third input data to the control input to manipulate the virtual binding.

10. The apparatus of claim 1, wherein the processing module is to move the virtual object from the touch screen display to a bezel of the apparatus.

11. A non-transitory computer readable medium encoded with computer executable instructions, which, when accessed, cause a machine to:
    generate a three-dimensional space having a first display of a real first device and a second display of a real second device and a space between the first display and the second display;
    receive a launch command as a gesture with respect to the first display, the launch command indicating that a virtual object is to be launched through the space toward the second display;
    determine a current relative position of the real first device with respect to the real second device;
    determine a trajectory through the space toward the second display based on the received launch command, the trajectory being further based on the current relative position of the real first device with respect to the real second device; and
    arrange to present a portion of the trajectory on the second display.

12. The medium of claim 11, wherein the machine receives the gesture as a touch screen motion performed on the first display to launch the virtual object from the first display, wherein the virtual object is presented on the first display before receiving the launch command.

13. The medium of claim 11, wherein the machine receives the gesture as a throwing motion performed with respect to the first display to throw the virtual object in connection with the first display, and wherein the virtual object is presented on the first display based on receiving the launch command before being presented on the second display.

14. The medium of claim 13, wherein the machine receives the throwing motion within view of a camera associated with the first display, and wherein receiving the launch command comprises receiving the launch command through the camera.

15. The medium of claim 11, wherein the machine receives the gesture within view of a camera, the medium further comprising instructions causing the machine to present a view of the gesture on the first display.

16. The medium of claim 11, wherein the machine receives the gesture in spatial relationship to the virtual object and wherein presenting a view of the gesture includes presenting a view of the virtual object and the spatial relationship to the gesture.

17. The medium of claim 11, wherein the machine receives the gesture in relationship to virtual bindings presented on the first display and wherein the virtual object is presented as interacting with the virtual bindings to be launched toward the second display.

18. The medium of claim 11, further encoded with computer executable instructions, which, when accessed, cause the machine to:
  receive an indication of a trajectory through the space from the second display to the first display; and
  present the virtual object on the first display after the virtual object was presented on the second display.

19. The medium of claim 18, further encoded with computer executable instructions, which, when accessed, cause the machine to:
  receive a further launch command as a gesture with respect to the first display after presenting the virtual object on the first display.

20. The medium of claim 11, further encoded with computer executable instructions, which, when accessed, cause the machine to:
  present a selection of virtual objects on the first display; and
  receive a command selecting a virtual object before receiving a launch command.

21. The medium of claim 20, wherein presenting a selection of virtual objects comprises:
  observing objects in the real space;
  generating a representation of at least one real object;
  generating a virtual object based on the representation of the real object; and
  presenting the generated virtual object with the selection of virtual objects on the first display.

22. An apparatus, comprising:
  an object velocity and direction module to generate a three-dimensional space having a first display of a real first device and a second display of a real second device and a space between the first display and the second display;
  an object and gesture recognition module to receive a launch command as a gesture with respect to the first display, the launch command indicating that a virtual object is to be launched through the space toward the second display;
  a virtual object behavior module to determine a trajectory through the space toward the second display based on the received launch command, the trajectory being further based on a relative position of the real first device with respect to the real second device; and
  a processing module to arrange to present a portion of the trajectory on the second display.

23. The apparatus of claim 22, wherein the gesture is performed in relationship to virtual bindings presented on the first display and wherein the processing module presents the virtual object as interacting with the virtual bindings to be launched toward the second display.

24. The apparatus of claim 22, further comprising a 3-D effects module to provide 3-D effects to the processing module and wherein the processing module presents a portion of the trajectory of the virtual object in 3-D.

* * * * *